US012567219B2

(12) United States Patent
Andersen et al.

(10) Patent No.: US 12,567,219 B2
(45) Date of Patent: Mar. 3, 2026

(54) APPARATUS AND METHOD FOR AUGMENTED REALITY TRAINING

(71) Applicant: ProTrainings, LLC, Ada, MI (US)

(72) Inventors: Scott Christopher Andersen, Lowell, MI (US); Adam Matthew Fox, Grand Rapids, MI (US); Jason Edwin Leighton, Portland, OR (US)

(73) Assignee: PROTRAININGS, LLC, Ada, MI (US)

( * ) Notice: Subject to any disclaimer, the term of this patent is extended or adjusted under 35 U.S.C. 154(b) by 115 days.

(21) Appl. No.: 18/605,082

(22) Filed: Mar. 14, 2024

(65) Prior Publication Data

US 2025/0292515 A1     Sep. 18, 2025

(51) Int. Cl.
*G06T 19/00* (2011.01)
*G06F 3/01* (2006.01)
*G06F 3/16* (2006.01)

(52) U.S. Cl.
CPC ............ *G06T 19/006* (2013.01); *G06F 3/016* (2013.01); *G06F 3/167* (2013.01)

(58) Field of Classification Search
CPC ........ G06T 19/006; G06F 3/016; G06F 3/167
See application file for complete search history.

(56) References Cited

U.S. PATENT DOCUMENTS

| | | | |
|---|---|---|---|
| 11,842,517 B2 | 12/2023 | Lyons | |
| 11,847,928 B2 * | 12/2023 | Andersen ................. | G09B 5/02 |
| 2020/0074165 A1 | 3/2020 | Ghafoor et al. | |
| 2023/0068660 A1 * | 3/2023 | Brent ...................... | G06F 9/453 |
| 2024/0371292 A1 * | 11/2024 | Schassler .............. | G06T 19/006 |

FOREIGN PATENT DOCUMENTS

| | | |
|---|---|---|
| WO | 2020161118 A1 | 8/2020 |
| WO | 2022241877 A1 | 11/2022 |

OTHER PUBLICATIONS

M Specht et al; Detecting Mistakes in CPR Training with Multimodal Data and Neural Networks; Sensors (Basel). Jul. 2019; 19(14): 3099.
H Xie et al; A novel algorithm of fast CPR quality evaluation based on kinect; Journal of Algorithms & Computational Technology, First published online Dec. 29, 2020.
E Hu et al; LoRA: Low-Rank Adaptation of Large Language Models; Oct. 16, 2021; https://arxiv.org/abs/2106.09685.
Pose detection; https://developers.google.com/ml-kit/vision/pose-detection; retrieved Apr. 1, 2024.
N Houlsby et al; Parameter-Efficient Transfer Learning for NLP; Jun. 13, 2019; https://arxiv.org/abs/1902.00751.

* cited by examiner

*Primary Examiner* — Jeffery A Brier
(74) *Attorney, Agent, or Firm* — Caldwell Intellectual Property Law

(57) ABSTRACT

In an aspect, an apparatus for procedural training is presented. An apparatus includes at least a processor and a memory communicatively connected to at least a processor. A memory contains instructions configuring at least a processor to receive optical data from a sensor in electronic communication with the at least a processor. At least a processor is configured to determine a procedural performance parameter as a function of optical data. At least a processor is configured to compare a procedural performance parameter to a procedural performance threshold. At least a processor is configured to display procedural training feedback through a display unit as a function of a comparison.

20 Claims, 11 Drawing Sheets

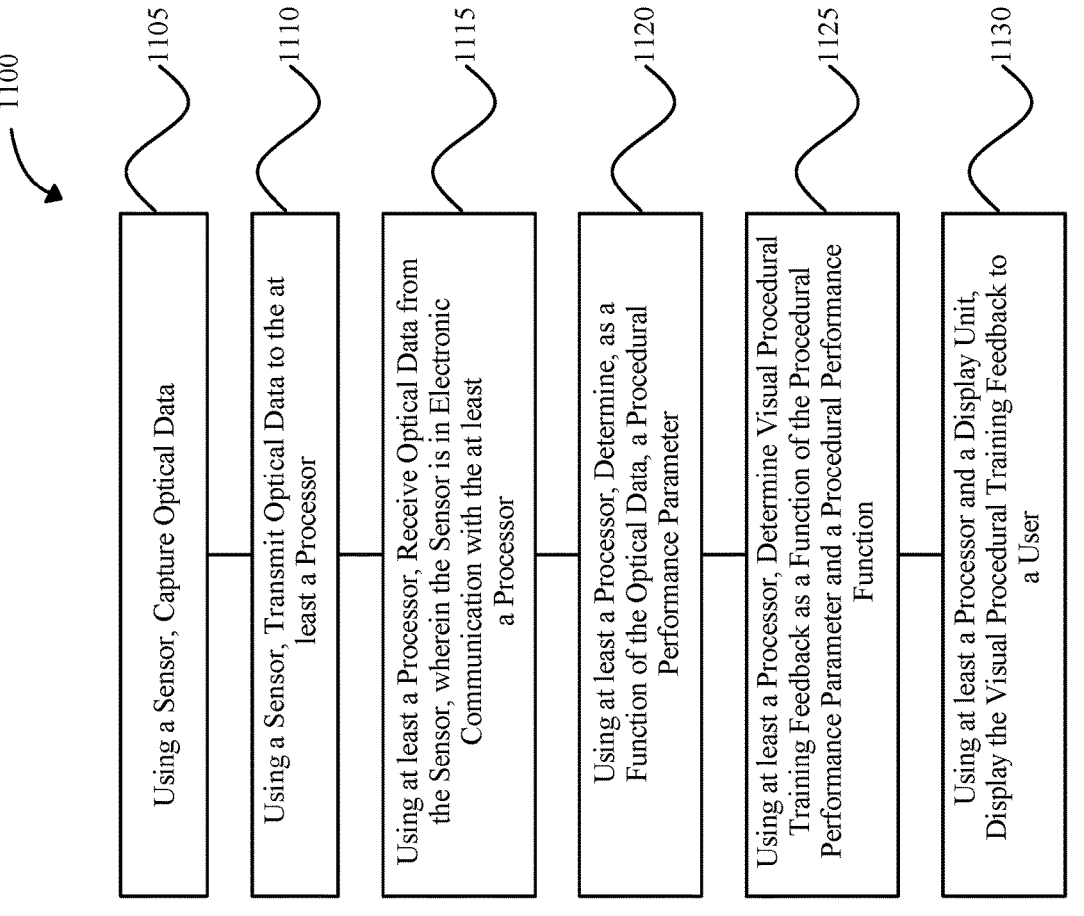

1100

1105 Using a Sensor, Capture Optical Data

1110 Using a Sensor, Transmit Optical Data to the at least a Processor

1115 Using at least a Processor, Receive Optical Data from the Sensor, wherein the Sensor is in Electronic Communication with the at least a Processor 1120 Using at least a Processor, Determine, as a Function of the Optical Data, a Procedural Performance Parameter 1125 Using at least a Processor, Determine Visual Procedural Training Feedback as a Function of the Procedural Performance Parameter and a Procedural Performance Function 1130 Using at least a Processor and a Display Unit, Display the Visual Procedural Training Feedback to a User

FIG. 11

APPARATUS AND METHOD FOR AUGMENTED REALITY TRAINING

FIELD OF THE INVENTION

The present invention generally relates to the field of procedural training. In particular, the present invention is directed to an apparatus and method for augmented reality training.

BACKGROUND

Many individuals look to become certified in varying procedures, such as cardiopulmonary resuscitation (CPR). However, modern procedural training can be costly and inefficient.

SUMMARY OF THE DISCLOSURE

In an aspect, an apparatus for augmented reality training includes at least a processor; a sensor configured to: capture optical data; and transmit optical data to the at least a processor; and a memory communicatively connected to the at least a processor, the memory containing instructions configuring the at least a processor to: receive optical data from the sensor, wherein the sensor is in electronic communication with the at least a processor; determine, as a function of the optical data, a procedural performance parameter; determine visual procedural training feedback as a function of the procedural performance parameter and a procedural performance function; and display, using a display unit, the visual procedural training feedback to a user; and wherein the visual procedural training feedback comprises image data comprising instructional material.

In another aspect, a method for augmented reality training includes using a sensor, capturing optical data; using a sensor, transmitting optical data to the at least a processor; using at least a processor, receiving optical data from the sensor, wherein the sensor is in electronic communication with the at least a processor; using at least a processor, determining, as a function of the optical data, a procedural performance parameter; using at least a processor, determining visual procedural training feedback as a function of the procedural performance parameter and a procedural performance function; and using at least a processor and a display unit, displaying the visual procedural training feedback to a user; and wherein the visual procedural training feedback comprises image data comprising instructional material.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 11 is a flow diagram of an exemplary embodiment of a method of procedural training.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Described herein is an apparatus for procedural training. An apparatus may include at least a processor and a memory communicatively connected to the at least a processor. A memory may contain instructions configuring at least a processor to receive optical data from a sensor in electronic communication with the at least a processor. A sensor may include a camera that is a component of an augmented reality (AR) device. At least a processor may be configured to determine a procedural performance parameter as a function of optical data. At least a processor may be configured to compare a procedural performance parameter to a procedural performance threshold. At least a processor may be configured to display procedural training feedback to a user as a function of this comparison. At least a processor may be configured to display procedural training feedback to a user visually using an AR device. At least a processor may be configured to communicate procedural training feedback to a user using audio. At least a processor may be configured to communicate procedural training feedback to a user through touch based feedback, such as haptic feedback. At least a processor may additionally be configured to communicate a procedural performance parameter to a user using, for example, an AR device.

Described herein is a method of using a computing device for procedural training. A method may include receiving optical data from a sensor in electronic communication with a computing device. A method may include determining a procedural performance parameter as a function of optical data. A method may include comparing a procedural performance parameter to a procedural performance threshold. A method may include displaying procedural training feedback to a user through a display unit as a function of a comparison. A method may include displaying procedural training feedback to a user through an AR device.

Embodiments illustrating aspects of the present disclosure are described below in the context of several specific examples.

Figure 1:
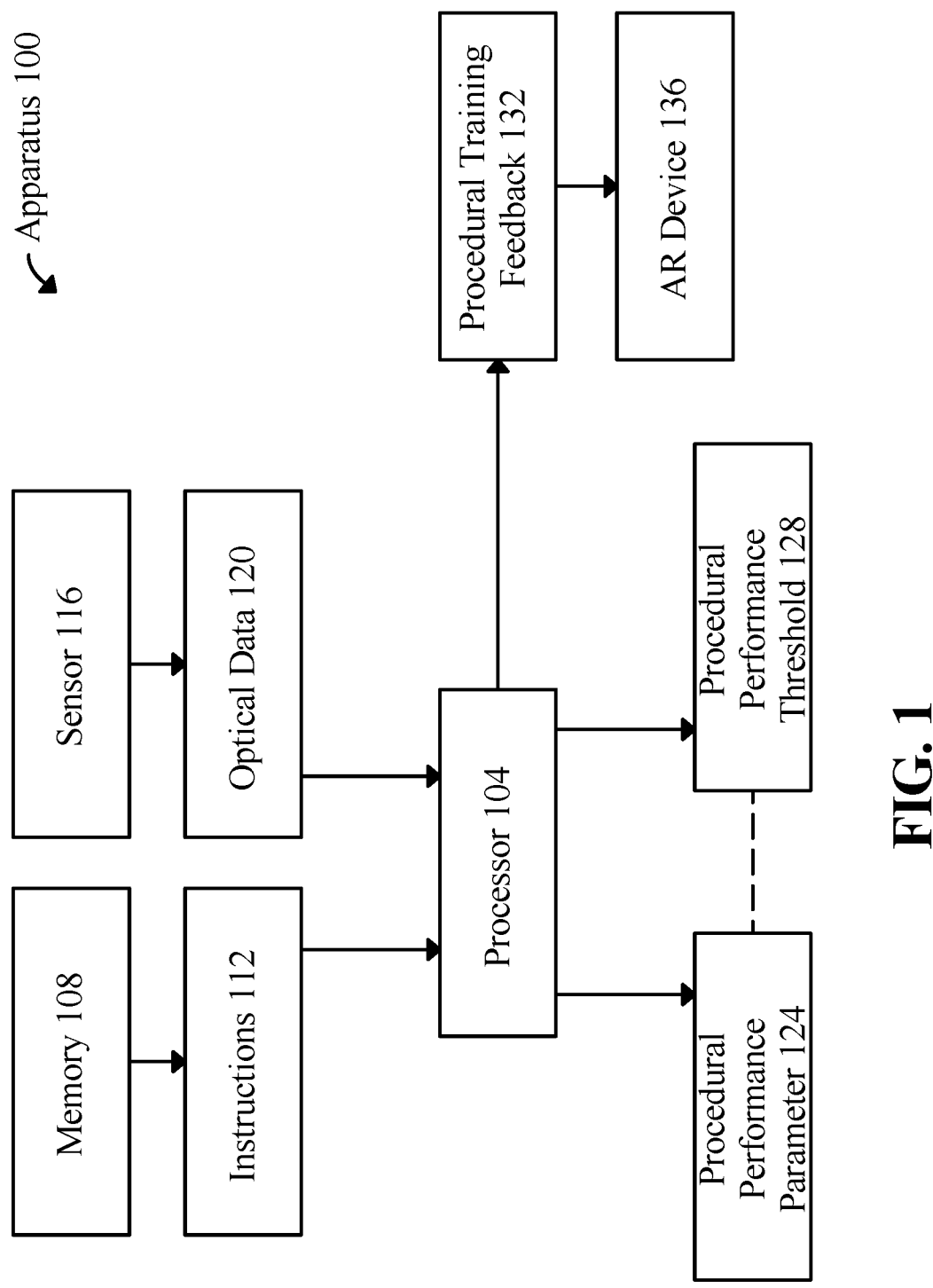
FIG. 1 is an exemplary embodiment of a block diagram of an apparatus for procedural training.

Referring now to FIG. 1, an exemplary embodiment of an apparatus 100 for procedural training is illustrated. Apparatus 100 may include a computing device. Apparatus 100 may include a computing device. Apparatus 100 may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device May be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

Still referring to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing devices including memory 108 and at least a processor 104 are described in further detail herein.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of system 100 and/or computing device.

Still referring to FIG. 1, in some embodiments, apparatus 100 may receive optical data 120 from a sensor 116 in electronic communication with at least a processor 104. In some embodiments, apparatus 100 may include at least a processor 104 and memory 108 communicatively connected to the at least processor 104, the memory 108 containing instructions 112 configuring the at least processor 104 to receive optical data 120 from a sensor 116 in electronic communication with at least a processor 104.

Still referring to FIG. 1, apparatus 100 may include sensor 116. A "sensor" as used herein is a device that measures natural phenomenon and transduces the measured natural phenomenon into one or more signals; one or more signals may include, without limitation, one or more electrical signals. Sensor 116 may include, without limitation, a camera, infrared sensor, depth sensor, Lidar sensor, pressure sensor, microphone, and the like. In some embodiments, sensor 116 may include, without limitation, one or more photodetectors, a charge-coupled device (CCD), photoresistor, photodiode, avalanche photodiode, single photon avalanche diode, photocapacitor, phototransistor, photovoltaic devices, and the like. Sensor 116 may be in electronic communication with at least a processor 104 of apparatus 100. "Electronic communication" as used in this disclosure is a shared data connection between two or more devices. In some embodiments, sensor 116 may include audio input devices, such as, but not limited to, microphones. In some embodiments, sensor 116 may include impact detection devices, such as, but not limited to, accelerometers, load cells, and the like. Sensor 116 may be configured to measure audio data in addition to optical data 120. "Audio data" as used in this disclosure is a metric pertaining to sounds. Audio data may include, but is not limited to, frequency, amplitude, and the like. In some embodiments, audio data may include data describing speech and/or other sounds originating from an individual. Sensor 116 may be in electronic communication via a wired and/or wireless connection to at least a processor of apparatus 100. In some embodiments, apparatus 100 may include two or more sensors 116.

Still referring to FIG. 1, in some embodiments, sensor 116 may include, but is not limited to, a smartphone camera, laptop camera, webcam, display unit camera, AR device camera, and the like. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some embodiments, sensor 116 may include a camera that is a component of a display unit. In some embodiments, sensor 116 may include a camera that is a component of an AR device. In some embodiments, an apparatus may include one or more cameras positioned and oriented such that they capture a field of view that is the same as, or similar to, a field of view seen by a user wearing an AR device. In some embodiments, an AR device may include a plurality of cameras, wherein the plurality of cameras are configured to capture stereoscopic images from the perspective of a user wearing an AR device, or from an approximation of the perspective of a user wearing an AR device. In some embodiments, a camera is configured to capture video.

Still referring to FIG. 1, in some embodiments, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. Sensor 116 may be configured to generate optical data 120. "Optical data" as used in this disclosure is information pertaining to visual phenomena. For instance and without limitation, optical data 120 may include color, contrast, motion, sharpness, blurriness, and the like. Optical data 120 may include, without limitation, images, videos, and the like. In some embodiments, optical data 120 may include image data as described above. In some embodiments, optical data 120 may include real-time video recordings of one or more individuals. For instance and without limitation, optical data 120 may include real-time video of an individual performing a procedure.

Still referring to FIG. 1, in some embodiments, apparatus 100 may include a machine vision system that includes sensor 116. A machine vision system may use images from sensor 116, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, in some embodiments, apparatus 100 may determine optical data 120 to include dimensions of objects and/or people, such as, but not limited to, length, height, width, volume, and the like. For instance and without limitation, apparatus 100 may determine that optical data 120 may include a height of an individual of 5 feet 10 inches. In some embodiments, apparatus 100 may determine skeletal data of optical data 120. "Skeletal data" as used in this disclosure is information pertaining to an individual's bones and/or joints. Skeletal data may include, but is not limited to, bone orientation, bone density, bone length, bone width, bone symmetry, and the like. As a non-limiting example, apparatus 100 may determine that optical data 120 may include a chest size of an individual, such as 40 inches. Apparatus 100 may determine that optical data 120 may include dimensions of a hand of an individual, such as, but not limited to, arm length, finger length, finger width, hand size, palm width, palm length, and the like. In some embodiments, apparatus 100 may determine that optical data 120 may include dimensions of a facial structure. Dimensions of a facial structure may include, but are not limited to, jaw length, jaw depth, nose length, nose width, mouth width, mouth height, and the like. In some embodiments, apparatus 100 may determine a gender of an individual through optical data 120. For example and without limitation, apparatus 100 may determine, based on a skeletal analysis of an individual's chest, waist, hips, height, volume, and the like, that an individual may be female. In some embodiments, apparatus 100 may determine an age of an individual. An age may include an estimated age, a range of ages, and the like. Apparatus 100 may determine a relative age based on a skeletal analysis of an individual. For instance and without limitation, apparatus 100 may determine an individual may be between 25 and 30 years old based on height, posture, facial structure, and the like. As another non-limiting example, apparatus 100 may determine an individual may be a toddler, infant, geriatric, and the like based on heights, postures, facial structures, and the like. Apparatus 100 may determine information about optical data 120 using a machine learning model and/or feature learning as described below, without limitation.

Still referring to FIG. 1, in some embodiments, apparatus 100 may utilize a machine vision system to analyze and/or determine information of optical data 120. In some embodiments, apparatus 100 may utilize a feature learning algorithm to determine one or more features of optical data 120. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of sets of optical data, as defined above, with each other. As a non-limiting example, feature learning algorithm may detect co-occurrences of skeletal data with each other. Apparatus 100 may perform a feature learning algorithm by dividing optical data from a given sensor into various sub-combinations of such data to create optical data sets as described above, and evaluate which optical data sets tend to co-occur with which other optical data sets; for instance, where optical data includes skeletal data, apparatus 100 may divide each skeletal datum into individual skeletal datums and evaluate which individual skeletal datums and/or combinations thereof tend to co-occur with which other individual skeletal datums, and/or other optical data. In an embodiment, first feature learning algorithm may perform clustering of data.

Still referring to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance an optical data training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of skeletal dimensions with multiple ages, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

Still referring to FIG. 1, computing device may generate a k-means clustering algorithm receiving unclassified optical data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related optical data, which may be provided with skeletal models; this may, for instance, generate an initial set of skeletal models from an initial set of optical data of a large number of users, and may also, upon subsequent iterations, identify new clusters to be provided new skeletal models, to which additional optical data may be classified, or to which previously used optical data may be reclassified.

Still referring to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $argmin_{ci \ni C}$ dist(ci, x)$^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $ci=1/|Si|\Sigma xi \ni Si^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected optical data set. Degree of similarity index value may indicate how close a particular combination of skeletal data and/or facial structures is to being classified by k-means algorithm to a particular cluster. K-means clustering algorithm may evaluate the distances of the combination of skeletal data and/or facial structures to the k-number of clusters output by k-means clustering algorithm. Short distances between a set of optical data and a cluster may indicate a higher degree of similarity between the set of optical data and a particular cluster. Longer distances between a set of optical data and a cluster may indicate a lower degree of similarity between an optical data set and a particular cluster.

Still referring to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an optical data set and the data entry cluster. Alternatively or additionally k-means clustering algorithm may select a plurality of clusters having low degree of similarity index values to optical data sets, indicative of greater degrees of similarity. Degree of similarity index values may be compared to a threshold number indicating a minimal degree of relatedness suitable for inclusion of a set of optical data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

Still referring to FIG. 1, in some embodiments, apparatus 100 may be configured to classify optical data 120. Apparatus 100 may utilize a machine vision system to classify optical data 120. In some embodiments, apparatus 100 may utilize an optical data classifier to classify optical data 120 to one or more groups. An "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Apparatus 100 and/or another device may generate a classifier using a classification algorithm, defined as a processes whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, apparatus 100 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Apparatus 100 may then calculate a likelihood table by calculating probabilities of different data entries and classification labels. Apparatus 100 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, apparatus 100 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, an "optical data classifier" as used in this disclosure is a machine learning model that categorizes optical data to categories and/or subcategories. An optical data classifier may be trained with training data correlating optical data to optical data groups and/or subgroups. Training data may be received through user input, external computing devices, and/or previous iterations of processing. An optical data classifier may input optical data 120 and output groups and/or subgroups of optical data, such as, but not limited to, objects, clothes, individuals, genders, ages, and the like. For instance and without limitation, apparatus 100 may use an optical data classifier to classify optical data 120 to age groups of individuals, such as infant, toddler, teenager, adult, elderly, and the like. In some embodiments, apparatus 100 may use an optical data classifier to classify skeletal data to subgroups, such as, but not limited to, arm bones, leg bones, shoulder blades, necks, ribcages, sternums, foot bones, and the like.

Still referring to FIG. 1, in some embodiments, apparatus 100 may determine a procedural performance parameter 124. In some embodiments, apparatus 100 may include at least a processor 104 and memory 108 communicatively connected to the at least processor 104, the memory 108 containing instructions 112 configuring the at least processor 104 to determine procedural performance parameter 124.

Still referring to FIG. 1, apparatus 100 may be configured to determine procedural performance parameter 124. In some embodiments, apparatus 100 may determine procedural performance parameter 124 as a function of optical data 120. In some embodiments, apparatus 100 may determine procedural performance parameter 124 as a function of audio data, such as data recorded by a microphone. In some embodiments, apparatus 100 may determine procedural performance parameter 124 as a function of optical data 120 and audio data. A "procedural performance parameter," as used in this disclosure, is a metric pertaining to one or more steps of a procedure. A "procedure" as used in this disclosure is a process having one or more steps. A procedure may include, but is not limited to, medical procedures, athletic procedures, sign language procedures, and the like. Medical procedures may include, without limitation, the Heimlich maneuver, seizure protocols, basic life support (BLS), advanced cardiovascular life support (ACLS), EpiPen administration, phlebotomy procedures, pediatric advanced life support (PALS), tracheotomy procedures, tourniquet procedures, putting on a sling, rapid physical exam, psycho motor exam, putting on a splint, immobilization on a long-board, immobilization on a Kendrick extrication device and the like. In some embodiments, a medical procedure may include cardiopulmonary resuscitation (CPR). In some embodiments, apparatus 100 may be configured to determine procedural performance parameter 124 as a function of a procedural performance machine learning model. A procedural performance machine learning model May be trained on training data correlating optical data to procedural performance parameters. Training data may be received through user input, external computing devices, and/or previous iterations of processing. In some embodiments, training data may be generated through data gathered by wearable sensors. In a non-limiting example, an individual may perform CPR on a mannequin while wearing an AR device including a camera and a pressure sensor on a glove. In this example, training data may be generated by correlating camera data with pressure sensor data. In another non-limiting example, training data may be generated by having individuals perform CPR on a mannequin while wearing an AR device including a camera and correlating the image data gathered by the camera with ratings by instructors observing the CPR. A procedural performance machine learning model may be configured to input optical data, such as optical data gathered by a camera component of an AR device and output procedural performance parameters, such as measurements relating to whether a user's hand placement is correct. In some embodiments, a procedural performance machine learning model may be trained to output a procedural performance parameter on a medical procedure.

Still referring to FIG. 1, in some embodiments, procedural performance parameter 124 may include data related to, without limitation, one or more steps of CPR. Procedural performance parameter 124 may include, but is not limited to, hand orientations. "Hand orientations" as used in this disclosure are positioning of hands. Hand orientations may include positioning of an individual's hand relative to a second hand of the individual. For instance and without limitation, a left hand may be placed on a right hand, and vice versa. Hand orientations may include finger orientations. For instance and without limitation, finger orientations may include positioning of an individual's fingers relative to one or more other fingers of the individual. As a non-limiting example, fingers of a left hand of an individual may be positioned within spaces between fingers on a right hand of the individual. In some embodiments, hand orientations may include an angle of a wrist bend. For instance and without limitation, an angle of a wrist bend may include 30 degrees clockwise. Hand orientations may include hand poses, such as, but not limited to, crossed fingers, open palm, two finger extensions, and the like. Hand poses may correlate to varying CPR procedures. For example and without limitation, CPR of an adult may require a two handed pose, CPR of a child may require a single hand pose, and CPR of an infant may include a two finger pose. 124 may include hand placements. "Hand placements" as used in this disclosure are positioning of hands on a surface of an object and/or entity. Hand placements may include positioning of an individual's hands on top a chest of another individual, object, and the like. For instance and without limitation, a hand positioning may include an alignment of hands on a sternum of a chest of an individual and/or mannequin. Hand placements may include measurements such as, but not limited to, inches, centimeters, millimeters, and the like. Hand placements may include coordinates along an x axis, y axis, and/or z axis. As a non-limiting example, a hand placement may include a palm of an individual's hand aligned 2 inches to the right of a sternum of an individual and/or mannequin.

Still referring to FIG. 1, in some embodiments, procedural performance parameter 124 may include arm orientations. An "arm orientation" as used in this disclosure is a positioning of an upper limb of an entity. An arm orientation may include positioning of an individual's arm. For instance and without limitation, a left arm of an individual may be crossed over a right arm of an individual, and vice versa. In some embodiments, arm orientation may include a positioning of an individual's arm relative to their chest. For instance and without limitation, an arm orientation may include an angle of 45 degrees between a pair of arms of an individual and a chest of the individual. Arm orientation may include elbow positioning. Elbow positioning may include a position of an individual's elbows relative to their arm. In some embodiments, elbow positioning may include a degree of bend. For instance and without limitation, a degree of bend of an elbow may include 15 degrees between a bicep and forearm of an individual.

Still referring to FIG. 1, in some embodiments, procedural performance parameter 124 may include chest compression data. "Chest compression data" as used in this disclosure is information pertaining to a contraction and/expansion of a breast of an individual. Chest compression data may include chest compression force. Chest compression force may be measured in newtons, pounds, and the like. Chest compression force may include a force applied to an individual and/or mannequin receiving CPR. For instance and without limitation, chest compression force may include 60 lbs of force applied to an individual's chest. In some embodiments, chest compression data may include chest compression depth. Chest compression depth may include a displacement of a chest of an individual. For instance and without limitation, chest compression depth may include 1.5 inches downwards from a resting point of a chest. In some embodiments, chest compression data may include chest compression frequency. Chest compression frequency may include a quantity of chest compressions given divided by a unit of time. For instance and without limitation, chest compression frequency may include a frequency of 1.6 chest compressions per second. In some embodiments, chest compression data may include chest compression pressure. Chest compression pressure may include an amount of force applied over an area of a chest. Chest compression pressure may be measured in pascals, pounds per square inch, and the like. For instance and without limitation, chest compression pressure may include 100 lbs of force per square inch. In some embodiments, chest compression data may include a quantity of chest compressions. A quantity of chest compressions may include a sum total of chest compressions given over a period of time. For instance and without limitation, chest compression quantity may include 200 chest compressions. In some embodiments, chest compression data may include a chest compression rate. A chest compression rate may include a quantity and/or number of chest compressions per unit of time. For instance and without limitation, a chest compression rate may include a rate of 2 chest compressions per second.

Still referring to FIG. 1, in some embodiments, procedural performance parameter 124 may include respiratory data. "Respiratory data" as used in this disclosure is information pertaining to lung functions of an individual. Respiratory data may include a quantity of breaths administered, such as, but not limited to, during mouth to mouth resuscitation. A quantity of breaths administered may include a sum total of breaths administered over a period of time. For instance and without limitation, a quantity of breaths administered may include 2 breaths a minute. Respiratory data may include breath pressure, such as 1-15 psi.

Still referring to FIG. 1, in some embodiments, procedural performance parameter 124 may include data related to, without limitation, one or more steps of putting a sling on a subject such as a mannequin. In some embodiments, putting a sling on a subject involves keeping a limb of a subject immobile without aggravating other injuries. In a non-limiting example, procedural performance parameter 124 may include data on whether a knot is positioned correctly. In a non-limiting example, procedural performance parameter 124 may include data on whether a swath is positioned correctly, such as positioned such that the subject is kept immobile. In a non-limiting example, procedural performance parameter 124 may include data on whether the sling has the appropriate degree of tension. 124 may include data related to, without limitation, one or more steps of splinting a subject such as a mannequin. In some embodiments, splinting a subject involves keeping a body part of a subject immobile without aggravating other injuries.

Still referring to FIG. 1, in some embodiments, procedural performance parameter 124 may include data related to, without limitation, one or more steps of a rapid physical exam. In some embodiments, a rapid physical exam involves examining a subject for injuries. In a non-limiting example, procedural performance parameter 124 may include whether a user palpated certain areas, checked for injuries such as burns, bruises, cuts, and swelling, and/or whether a user checked for whether a subject is in pain. In some embodiments, audio of a rapid physical exam may be recorded and a speech recognition process and/or a language model, both described below, may be used to interpret user speech; procedural performance parameter 124 may include data on whether a user asked a subject whether the subject is in pain and/or attempted to get the attention of the subject.

Still referring to FIG. 1, in some embodiments, procedural performance parameter 124 may include data related to, without limitation, one or more steps of a psycho motor exam. In some embodiments, a psycho motor exam may include an examination of whether a subject's senses and/or motor functions are working correctly, such as by touching a finger and asking the subject which finger is being touched. In a non-limiting example, audio of a psycho motor exam may be recorded, a speech recognition process and/or a language model may be used to interpret user speech, and procedural performance parameter 124 may be determined, where procedural performance parameter 124 may include data on whether a user sufficiently checked for sensory and motor functions.

Still referring to FIG. 1, in some embodiments, procedural performance parameter 124 may include data related to, without limitation, one or more steps of immobilizing a subject such as a mannequin on a longboard. In some embodiments, immobilization on a longboard involves immobilizing a subject in a lying down position to prevent further injury. In a non-limiting example, procedural performance parameter 124 may include whether straps are applied in the correct places, and/or whether a cervical collar and a head immobilization element are applied in the correct order. 124 may include data related to, without limitation, one or more steps of immobilizing a subject such as a mannequin using a Kendrick extrication device. In some embodiments, immobilization using a Kendrick extrication device involves immobilizing a subject in a seated position to prevent further injury. In a non-limiting example, procedural performance parameter 124 may include whether straps are applied in the correct places, and/or whether a cervical collar and a head immobilization element are applied in the correct order.

Still referring to FIG. 1, in some embodiments, procedural performance parameter 124 may include data related to medical procedure training, using a mannequin as a subject. Still referring to FIG. 1, in some embodiments, procedural performance parameter 124 may include data related to medical procedure training, using a healthy human as a subject (as in, practicing a medical procedure such as applying a sling in a low-risk environment).

Still referring to FIG. 1, in some embodiments, apparatus 100 may utilize a machine vision system as described above to determine procedural performance parameter 124. For instance, and without limitation, apparatus 100 may use a machine vision system to identify and separate individuals from objects, backgrounds, and the like of video recordings and/or images of optical data 120.

Still referring to FIG. 1, a machine vision system may use images, such as images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting examples of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

Still referring to FIG. 1, in some embodiments, apparatus 100 may be configured to perform a pose estimation technique. A "pose estimation technique" as used in this disclosure is a computer vision process of predicting and tracking a location of an individual or object. A pose estimation technique may include, but is not limited to, bottom-up approaches, top-down approaches, 2D pose estimation, 3D pose estimation, and the like. In some embodiments, a pose estimation technique may include, without limitation, kinematic models, planar models, and/or volumetric models. Apparatus 100 may be configured to utilize a pose estimation machine learning model. A pose estimation machine learning model may be trained with training data correlating optical data to pose estimations. Training data may be received from user input, external computing devices, and/or previous iterations of processing. A pose estimation machine learning model may input optical data 120 and output pose estimations. Apparatus 100 may be configured to perform a skeletal analysis of motion of one or more individuals. A skeletal analysis of motion may include generating a skeleton-based model of an individual. A skeleton-based model may include one or more sets of key points of kinematic analysis, such as but not limited to ankles, knees, shoulders, elbows, wrists, and/or limb orientations. Apparatus 100 may be configured to utilize a skeletal analysis machine learning model. A skeletal analysis machine learning model may be trained with training data correlating optical data to skeletal analysis. Training data may be received through user input, external computing devices, and/or previous iterations of processing. A skeletal analysis machine learning model may be configured to input optical data and output skeletal analysis. Apparatus 100 may utilize a skeletal analysis of motion to determine and/or predict procedural performance parameter 124 such as, but not limited to, positioning, dimensions, and the like. For instance and without limitation, procedural performance parameter 124 may include data related to hand positioning of an individual. Hand positioning may include an alignment of hands, fingers, palms, and the like. In some embodiments, hand positioning may include positioning relative to another object or individual. For instance and without limitation, hand positioning may include an alignment of one or more hands on top a chest of an individual.

Still referring to FIG. 1, apparatus 100 may determine kinetics of procedural performance parameter 124. "Kinetics" as used in this disclosure is information pertaining to movement. Kinetics may include, but are not limited to, force, pressure, acceleration, rotations, and the like. Procedural performance parameter 124 may include a force applied from one individual to another individual. For example, in a CPR process, procedural performance parameter 124 may include pressure applied from one or more hands of a first individual to a chest of a second individual receiving CPR. For example and without limitation, procedural performance parameter 124 may include a pressure of 120 lbs. per square inch. Procedural performance parameter 124 may include an acceleration of an individual, such as an individual's acceleration of their arms and/or hands. For example procedural performance parameter 124 may include an acceleration of one or more hands of an individual, such as 4 cm/s. In some embodiments, procedural performance parameter 124 may include rotations of an individual. For example, procedural performance parameter 124 may include a rotation of a head of an individual receiving CPR, such as 10 degrees clockwise. In some embodiments, procedural performance parameter 124 may include depth data. "Depth data" as used in this disclosure is information pertaining to a distance of a top of an object or entity to a bottom of an object or entity. Depth data may include, but is not limited to, compression depth, decompression depth, chest depth, and the like. For instance and without limitation, depth data may include a compression depth of a chest of an individual of 2 inches. In some embodiments, procedural performance parameter 124 may include a frequency of an action. A frequency of an action may include, without limitation, chest compressions, breaths administered, and the like. As a non-limiting example, performance parameter 124 may include a frequency of about 100 to 120 chest compressions per minute. In some embodiments, apparatus 100 may be configured to utilize a kinetic machine learning model. A kinetic machine learning model may be trained with training data correlating procedural performance parameters and/or optical data to kinetics. Training data may be received through user input, external computing devices, and/or previous iterations of processing. Apparatus 100 may utilize a kinetic machine learning model to determine kinetics of procedural performance parameter 124. In some embodiments, each machine learning model described above may be combined into a single machine learning model. In other embodiments, each machine learning model described above may be separate from one another.

Still referring to FIG. 1, in some embodiments, audio data may be processed using automatic speech recognition. In some embodiments, audio data including user speech may be recorded using a microphone, such as a microphone component of an AR device; automatic speech recognition may be applied to audio data to convert the audio data into a different data form, such as a text transcript of speech within the audio data. Such data may then be input into a language model, as described below, such that the speech may be interpreted. In some embodiments, procedural performance parameter 124 may be determined as a function of speech interpreted in this way. In some embodiments, a language model may be trained on a dataset correlating language use during a medical procedure with ratings as to how effective it is. In a non-limiting example, in a psycho motor exam, if a user does not ask a subject whether the subject can feel certain stimuli, then this may be correlated with a poor rating and used as a training data point when training a language model. Language models are described in further detail below.

Still referring to FIG. 1, in some embodiments, automatic speech recognition may require training (i.e., enrollment). In some cases, training an automatic speech recognition model may require an individual speaker to read text or isolated vocabulary. In some cases, audio training data may include an audio component having an audible verbal content, the contents of which are known a priori by a computing device. Computing device may then train an automatic speech recognition model according to training data which includes audible verbal content correlated to known content. In this way, computing device may analyze a person's specific voice and train an automatic speech recognition model to the person's speech, resulting in increased accuracy. Alternatively, or additionally, in some cases, computing device may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within audio data, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for malefemale normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., audible verbal content) speeds. In some cases, DTW may allow computing device to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 7-9. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, audio data may be processed using automatic speech recognition, then interpreted using a language model. In some embodiments, audio data including user speech may be recorded using a microphone, such as a microphone component of an AR device; automatic speech recognition may be applied to audio data to convert the audio data into a different data form, such as a text transcript of speech within the audio data, and a language model may be used to interpret the speech. In some embodiments, procedural performance parameter 124 may be determined as a function of speech interpreted using a language model. In some embodiments, a language model may be trained on a dataset correlating language use during a medical procedure with ratings as to how effective it is. In a non-limiting example, in a psycho motor exam, if a user does not ask a subject whether the subject can feel certain stimuli, then this may be correlated with a poor rating and used as a training data point when training a language model. Language models are described in further detail below.

Still referring to FIG. 1, in some embodiments, a language model may be used to process audio data and/or transcribed audio data. As used herein, a "language model" is a program capable of interpreting natural language, generating natural language, or both. In some embodiments, a language model may be configured to interpret the output of an automatic speech recognition function and/or an OCR function. A language model may include a neural network. A language model may be trained using a dataset that includes natural language.

Still referring to FIG. 1, generating language model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, processor 104 may determine one or more language elements in audio data and/or transcribed audio data by identifying and/or detecting associations between one or more language elements (including phonemes or phonological elements, morphemes or morphological elements, syntax or syntactic elements, semantics or semantic elements, and pragmatic elements) extracted from at least user data and/or response, including without limitation mathematical associations, between such words. Associations between language elements and relationships of such categories to other such term may include, without limitation, mathematical associations, including without limitation statistical correlations between any language element and any other language element and/or Language elements. Processor 104 may compare an input such as a sentence from audio data and/or transcribed audio data with a list of keywords or a dictionary to identify language elements. For example, processor 104 may identify whitespace and punctuation in a sentence and extract elements comprising a string of letters, numbers or characters occurring adjacent to the whitespace and punctuation. Processor 104 may then compare each of these with a list of keywords or a dictionary. Based on the determined keywords or meanings associated with each of the strings, processor 104 may determine an association between one or more of the extracted strings and a function of a user operating apparatus 100, such as an association between a string containing the phrase "can you feel" and a psycho motor exam. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory.

Still referring to FIG. 1, processor 104 may be configured to determine one or more language elements in audio data and/or transcribed audio data using machine learning. For example, processor 104 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrase, and/or other semantic unit. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Still referring to FIG. 1, processor 104 may be configured to determine one or more language elements in audio data and/or transcribed audio data using machine learning by first creating or receiving language classification training data. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g. associating one written language element with another written language element) or different language elements (e.g. associating a spoken language element with a written representation of the same language element). Associations may be identified between similar communication types of two different language elements, for example written input consisting of the syntactic element "that" may be associated with written phonemes /th/, /ă/, and /t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and/or run using processor 104, or another computing device. Language classification training data may create associations between any type of language element in any format and other type of language element in any format. Additionally, or alternatively, language classification training data may associate language element input data to actions related to an operator of apparatus 100. For example, language classification training data may associate occurrences of the syntactic elements "can," "you," and "feel" in a single sentence with the action of conducting a psycho motor exam.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in some embodiments, apparatus 100 may compare procedural performance parameter 124 to a procedural performance function. In some embodiments, apparatus 100 may include at least a processor 104 and memory 108 communicatively connected to the at least processor 104, the memory 108 containing instructions 112 configuring the at least processor 104 to compare procedural performance parameter 124 to procedural performance function.

Still referring to FIG. 1, apparatus 100 may be configured to compare procedural performance parameter 124 to procedural performance function. A "procedural performance function" as used herein is a function associating procedural performance parameters with a measure of desirability or accuracy to correct procedure. A procedural performance function may include, in non-limiting examples, thresholds where one side of the threshold is more desirable than the other, and ranges, where a procedural performance parameter inside or outside of the range is optimal. In an additional non-limiting example, a procedural performance function may include a mapping of desirability values in a multidimensional space, where each dimension is associated with a procedural performance parameter; the dimensions may correspond to, for example, chest compression depth, chest compression rate, and chest compression location. In this example, chest compressions at the appropriate depth, rate, and location may be associated with high desirability, but chest compressions that are too rapid, too shallow, and too far to one side may be associated with low desirability. Such a procedural performance function may be used, for example, where there are multiple sets of procedural performance parameters that achieve a desirable result but where they are not sufficiently described using simpler models.

Still referring to FIG. 1, in some embodiments, apparatus 100 may compare procedural performance parameter 124 to a procedural performance threshold 128. In some embodiments, apparatus 100 may include at least a processor 104 and memory 108 communicatively connected to the at least processor 104, the memory 108 containing instructions 112 configuring the at least processor 104 to compare procedural performance parameter 124 to procedural performance threshold 128.

Still referring to FIG. 1, apparatus 100 may be configured to compare procedural performance parameter 124 to procedural performance threshold 128. A "procedural performance threshold" as used in this disclosure is a value constraining a procedure. Procedural performance threshold 128 may include values such as, but not limited to, quantity of chest compressions, time between chest compressions, depth of chest compressions, pressure of chest compressions, and the like. For instance and without limitation, procedural performance threshold 128 may include a depth of between 2 inches and 2.4 inches. In some embodiments, procedural performance threshold 128 may include an ideal performance parameter. An "ideal performance parameter" as used in this midcourse is an optimal metric of a procedure. For instance and without limitation, an ideal performance parameter may include a frequency of chest compressions, a depth of chest compression, pressure of a chest compression, hand orientation, arm orientation, recipient head positioning, and the like. Procedural performance threshold 128 may be determined by apparatus 100 through an ideal performance parameter machine learning model. An ideal performance parameter machine learning model may be trained with training data correlating procedural performance parameters to ideal performance parameters. Training data may be received through user input, external computing devices, and/or previous iterations of processing. An ideal performance parameter machine learning model may be configured to input procedural performance parameters and output ideal performance parameters. Apparatus 100 may use an ideal performance parameter machine learning model to determine procedural performance threshold 128. In some embodiments, procedural performance threshold 128 may include a fuzzy set, one or more parameters and/or coefficients of a fuzzy set, a centroid or other geometric element of a fuzzy set and/or defuzzification threshold. For instance and without limitation, procedural performance threshold 128 may include a fuzzy set coefficient, centroid, and the like. In some embodiments, comparing procedural performance parameter 124 to procedural performance threshold 128 may include determining a degree of fuzzy set membership and/or any application of any fuzzy inferencing system as described in this disclosure, such as described below with reference to FIG. 6. Any threshold, process for comparison, and/or parameters thereof, including without limitation any coefficient and/or other parameter of a fuzzy set, TSK function, fuzzy inferencing system, or the like may be tuned using a machine learning model, which may include any model as described herein, which may be trained with training data associating parameters to examples included in and/or excluded from "correct" ranges, and/or representing "ideal" parameters. Training examples may include input from experts, data obtained through recordation of successful applications of CPR, and the like.

Still referring to FIG. 1, in some embodiments, apparatus 100 may communicate with a procedural database. A "procedural database" as used in this disclosure is a collection of information pertaining to a procedure. In some embodiments, a procedural database may include, but is not limited to, medical databases, professional databases, and the like. In some embodiments, apparatus 100 may generate a procedural database through iterations of processing. A database may be implemented, without limitation, as a relational database, a key-value retrieval database such as a NOSQL database, or any other format or structure for use as a database that a person skilled in the art would recognize as suitable upon review of the entirety of this disclosure. A database may alternatively or additionally be implemented using a distributed data storage protocol and/or data structure, such as a distributed hash table or the like. A database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, apparatus 100 may use an objective function to compare measured performance 124 to performance parameter 128. An "objective function" as used in this disclosure is a process of minimizing or maximizing one or more values based on a set of constraints. Apparatus 100 may generate an objective function to optimize a comparison of procedural performance parameter 124 to procedural performance threshold 128. In some embodiments, an objective function of apparatus 100 may include an optimization criterion. An optimization criterion may include any description of a desired value or range of values for one or more attributes of a procedural performance parameter; desired value or range of values may include a maximal or minimal value, a range between maximal or minimal values, or an instruction to maximize or minimize a procedural performance parameter. As a non-limiting example, an optimization criterion may specify that a procedural performance parameter should include at least 100 chest compressions a minute; an optimization criterion may cap a difference of a procedural performance parameter and a performance parameter threshold, for instance specifying that a procedural performance parameter must not have a difference from a performance parameter threshold greater than a specified value. An optimization criterion may specify one or more tolerances for differences in procedural performance parameters. An optimization criterion may specify one or more desired performance criteria for a procedural performance threshold. In an embodiment, an optimization criterion may assign weights to different procedural performance parameters or values associated with procedural performances; weights, as used herein, may be multipliers or other scalar numbers reflecting a relative importance of a particular procedural performance parameter or value. One or more weights may be expressions of value to a user of a particular outcome, performance value, or other facet of a matching process. As a non-limiting example, minimization of differences of a procedural performance parameter and one or more procedural performance thresholds may be multiplied by a first weight, while tolerance above a certain value may be multiplied by a second weight. Optimization criteria may be combined in weighted or unweighted combinations into a function reflecting an overall outcome desired by a user; a function may be a procedural performance parameter function to be minimized and/or maximized. A function may be defined by reference to performance criteria constraints and/or weighted aggregation thereof as provided by apparatus 100; for instance, a procedural performance parameter function combining optimization criteria may seek to minimize or maximize a function of a procedural performance.

Still referring to FIG. 1, apparatus 100 may use an objective function to compare procedural performance parameter 124 to performance parameter threshold 128. Generation of an objective function may include generation of a function to score and weight factors to achieve a performance score for each feasible pairing. In some embodiments, pairings may be scored in a matrix for optimization, where columns represent procedural performance parameters and rows represent performance parameter thresholds potentially paired therewith; each cell of such a matrix may represent a score of a pairing of the corresponding procedural performance parameter to the corresponding performance parameter threshold. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 100 may select pairings so that scores associated therewith are the best score for each procedural performance parameter match and/or for each performance parameter threshold. In such an example, optimization may determine the combination of procedural performance parameters matches such that each procedural performance parameter pairing includes the highest score possible.

Still referring to FIG. 1, an objective function may be formulated as a linear objective function. Apparatus 100 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r\in R} \Sigma_{s\in S} c_{rs}x_{rs}$, where R is a set of all procedural performance parameters r, S is a set of all performance parameter thresholds s, $c_{rs}$ is a score of a pairing of a given procedural performance parameter with a given match, and $x_{rs}$ is 1 if a procedural performance parameter r is paired with a performance parameter threshold s, and 0 otherwise. Continuing the example, constraints may specify that each procedural performance parameter is assigned to only one procedural performance threshold, and each procedural performance threshold is assigned only one procedural performance parameter. Procedural performance parameters and procedural performance thresholds may be as described above. Sets of procedural performance parameters may be optimized for a maximum score combination of all generated procedural performance parameters. In various embodiments, apparatus 100 may determine a combination of procedural performance parameters that maximizes a total score subject to a constraint that all procedural performance parameters are paired to exactly one performance parameter threshold. Not all procedural performance parameters may receive a procedural performance threshold pairing since each procedural performance parameter may only produce one procedural performance threshold. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 100 and/or another device, and/or may be implemented on third-party solver.

Still referring to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score procedural performance parameters as described above, calculate an output of mathematical expression using the variables, and select a pairing that produces an output having the lowest size, according to a given definition of "size," of the set of outputs representing each of plurality of procedural performance parameter combinations; size may, for instance, included absolute value, numerical size, or the like. Selection of different loss functions may result in identification of different potential pairings as generating minimal outputs. Objectives represented in an objective function and/or loss function may include minimization of differences between procedural performance parameters and procedural performance thresholds. Objectives may include minimization of time in between chest compressions of a procedural performance parameter. Objectives may include maximization of scores of procedural performance parameters.

Still referring to FIG. 1, apparatus 100 may use an objective function to compare procedural performance parameter 124 to performance parameter threshold 128. Apparatus 100 may be configured to evaluate an objective function, such as an objective function described above, to compare procedural performance parameter 124 to procedural performance threshold 128. Evaluating an objective function may include minimizing, maximizing, and/or optimizing the objective function. As a non-limiting example, apparatus 100 may compare a positioning of hands of procedural performance parameter 124 an ideal positioning of hands of performance parameter threshold 128. In some embodiments, apparatus 100 may compare procedural performance parameter 124 to a pre-selected performance parameter threshold 128 to determine an overall score of procedural performance parameter 124. In some embodiments, apparatus 100 may determine performance parameter thresholds 128 based on previous iterations of processing, other user performances, and the like. Performance parameter threshold 128 may be tuned by a machine learning model, such as a machine learning model described in FIG. 5.

Still referring to FIG. 1, in some embodiments, apparatus 100 may be configured to score procedural performance parameter 124 as a function of a scoring criterion. A "scoring criterion" as used in this disclosure is an attribute constraining a value of an action. A scoring criterion mat include performance parameter threshold 128 as described above. In some embodiments, a scoring criterion may include, but is not limited to, hand positioning, rate of chest compressions, depth of chest compressions, and the like. Apparatus 100 may determine a score of performance parameter 124, such as on a range of 1 to 10, a range of 1 to 100, out of 5 stars, and the like. In some embodiments, a score may include a word and/or phrase, such as, and without limitation, "good", "great", "ok", "correct", "incorrect", "perfect" and the like. In some embodiments, apparatus 100 may be configured to score procedural performance parameter 124 through a fuzzy logic system, as described below in FIG. 10.

Still referring to FIG. 1, in some embodiments, apparatus 100 may transmit optical data to an instructor device as a function of procedural performance parameter 124. In some embodiments, apparatus 100 may include at least a processor 104 and memory 108 communicatively connected to the at least processor 104, the memory 108 containing instructions 112 configuring the at least processor 104 to transmit optical data to an instructor device as a function of procedural performance parameter 124.

Still referring to FIG. 1, in some embodiments, apparatus 100 may transmit optical data to an instructor device as a function of a comparison between procedural performance parameter 124 and procedural performance threshold 128. In some embodiments, apparatus 100 may include at least a processor 104 and memory 108 communicatively connected to the at least processor 104, the memory 108 containing instructions 112 configuring the at least processor 104 to transmit optical data to an instructor device as a function of a comparison between procedural performance parameter 124 and procedural performance threshold 128. In some embodiments, apparatus 100 may transmit optical data to an instructor device as a function of a comparison between procedural performance parameter 124 and procedural performance function.

Still referring to FIG. 1, apparatus 100 may transmit optical data to an instructor device if, in a non-limiting example, apparatus 100 determines a procedural performance parameter that indicates that a substantial correction is needed. In some embodiments, apparatus 100 may transmit optical data to an instructor device in such a way that configures the instructor device to display the optical data to an instructor. In some embodiments, an instructor may include an instructor trained in a medical procedure, such as a medical procedure being attempted by a user. In some embodiments, optical data may include data captured by one or more cameras on an AR device worn by a user, and transmission of the optical data to an instructor device may allow an instructor to see user actions from the perspective of the user, or from an approximation of the perspective of the user. In some embodiments, apparatus 100 may be configured to receive instructional data from instructor device. Instructional data may include, in non-limiting examples, a video demonstration of an instructor performing a procedure, a verbal description of how to correctly perform a procedure, a link to a video showing an effective demonstration of the procedure, and the like. In some embodiments, apparatus 100 may be configured to communicate instructional data to a user through an AR device. In non-limiting examples, instructional data including a video may be displayed to a user using an AR device, and instructional data including audio may be communicated to a user using speakers in an AR device. In some embodiments, apparatus 100 may be configured to transmit audio data to instructor device, receive instructor audio data from instructor device, and communicate instructor audio data to a user; this may allow user and instructor to communicate, and discuss, for example, how to correct user's form when performing a procedure.

Still referring to FIG. 1, in some embodiments, apparatus 100 may determine visual procedural training feedback. In some embodiments, apparatus 100 may include at least a processor 104 and memory 108 communicatively connected to the at least processor 104, the memory 108 containing instructions 112 configuring the at least processor 104 to determine visual procedural training feedback.

Still referring to FIG. 1, apparatus 100 may determine procedural training feedback 132 as a function of a comparison of procedural performance parameter 124 and procedural performance threshold 128. Apparatus 100 may determine procedural training feedback 132 as a function of a comparison of procedural performance parameter 124 and procedural performance function. "Procedural training feedback" as used in this disclosure is information pertaining to a competency of a procedural performance. Procedural training feedback 132 may include, but is not limited to, images, text, words, sounds, and the like. In some embodiments, procedural training feedback 132 may be generated as a function of a feedback machine learning model. A feedback machine learning model may be trained with training data correlating procedural performance parameters and procedural performance parameter threshold to procedural training feedback. Training data may be received through user input, external computing devices, and/or previous iterations of processing, methods, and/or method steps as described in this disclosure. A feedback machine learning model may be configured to input procedural performance parameter 124 and/or procedural performance threshold 128 and output procedural training feedback 132. Procedural training feedback 132 may be specific to procedural performance parameter 124. For instance and without limitation, procedural performance parameter 124 may include a depth of a chest compression of 1 inch. Procedural training feedback 132 may include a suggested correction of a depth of a chest compression to at least 2 inches. In some embodiments, processor 104 may retrieve procedural training feedback 132 from a lookup table, database, or the like. In a non-limiting example, processor 104 may compare procedural performance parameter 124 to procedural performance threshold 128 and/or procedural performance function and may retrieve procedural training feedback 132 from a database or lookup table based on the relationship between procedural performance parameter 124 and procedural performance threshold 128 and/or procedural performance function. In a non-limiting example, if a comparison between procedural performance parameter 124 and procedural performance threshold 128 indicates that a user is performing chest compressions too rapidly, then processor 104 may retrieve procedural training feedback 132 including guidance on slowing chest compression rate from a database. In another non-limiting example, if a comparison between procedural performance parameter 124 and procedural performance threshold 128 indicates that a user is securing mannequin on a longboard improperly, then processor 104 may retrieve procedural training feedback 132 including a demonstration of properly securing a mannequin on a longboard. In some embodiments, procedural training feedback may include visual feedback. In some embodiments, visual feedback may be communicated to a user through a display unit. In a non-limiting example, procedural training feedback 132 may include a video demonstration by an instructor of how to properly apply a sling to a mannequin. In another non-limiting example, procedural training feedback 132 may include visual display of text listing the steps involved in a rapid physical exam. In another non-limiting example, procedural training feedback 132 a video demonstration of a psycho motor exam, from the perspective of an individual administering the psycho motor exam. In some embodiments, procedural training feedback may include audio feedback. In some embodiments, audio feedback may be communicated to a user through an audio feedback unit. In a non-limiting example, procedural training feedback 132 may include a recording of a spoken description by an instructor of how to properly secure an individual on a longboard. In another non-limiting example, procedural training feedback 132 may include a video of a demonstration of how to properly perform chest compressions, along with audio of the demonstration. In another non-limiting example, procedural training feedback 132 may include a first sound indicating when a user has performed a process properly, and a second sound indicating when a user has performed a process incorrectly. In some embodiments, procedural training feedback may include haptic feedback. In some embodiments, haptic feedback may be communicated to a user through a haptic feedback unit. In a non-limiting example, a mannequin may include a haptic feedback unit configured to provide haptic feedback detectable to a user performing chest compressions on the mannequin, through the user's hands as the user performs chest compressions.

Still referring to FIG. 1, in some embodiments, procedural training feedback may include image data. In some embodiments, such image data may include instructional material. Procedural training feedback including image data including instructional material may include, in non-limiting examples, a video of an instructor demonstrating how to perform CPR, an image of an instructor demonstrating a step of a psycho motor exam, an image including text describing the steps of a psycho motor exam, and an image of a mannequin properly secured on a longboard.

Still referring to FIG. 1, apparatus 100 may be configured to display procedural training feedback 132 through display unit. A "display unit" as used in this disclosure is a device that communicates information to a user visually. In some embodiments, a display unit may include a screen. In some embodiments, a display unit may include a device configured to project an image onto a surface. Display unit may include, but is not limited to, AR devices monitors, laptops, smartphones, tablets, and the like. In some embodiments, display unit is an AR device 136. AR devices are described in further detail below with respect to FIGS. 4-6. In some embodiments, display unit is a VR device. When used as a verb herein, "display" is any form of providing visual information to a user. When used as a noun herein, a "display" is a device for visual presentation. Displaying may include, without limitation, showing computer icons and/or other visual elements on a screen. A display may include, without limitation, a screen, a projector configured to project an image onto a surface, and the like. In some embodiments, apparatus 100 may be configured to generate a graphical user interface (GUI) on display unit. For instance and without limitation, a GUI of display unit may include one or more computer icons that may be interactable through user input. Apparatus 100 may be configured to receive user input through a GUI of display unit. For instance and without limitation, user input may include selecting a training module, selecting a review of procedural training feedback 132, and the like.

Still referring to FIG. 1, in some embodiments, apparatus 100 may be configured to select contents and/or forms of elements to display through display unit, such as without limitation a GUI of display unit. Contents may be selected from a plurality of contents that may be displayed. Selection may include choosing contents and/or elements to improve case of use of display for a user, who may otherwise have to navigate through irrelevant documentation, use guesswork/keyword searching, and the like. In some embodiments, apparatus 100 may utilize a fuzzy logic system to select content to display through display unit. In some embodiments, contents displayed through display unit may include guidance for a procedure. For example and without limitation, display unit may display CPR guidance for a user. Contents may include, but are not limited to, procedural data, procedural performance data, procedural performance feedback, and the like. In some embodiments, apparatus 100 may utilize a content machine learning model. A content machine learning model may be trained with training data correlating procedural performance feedback data to content selection. Training data may be received through user input, external computing devices, and/or previous iterations of processing. In some embodiments, a content machine learning model may input procedural performance feedback data and output a selection of content. Apparatus 100 may use a content machine learning model to select content to display.

Still referring to FIG. 1, in some embodiments, apparatus 100 may be configured to select a guidance for a user to display through display unit. Guidance may include a visual form, such as without limitation icons, charts, graphs, images, videos, animations, and the like. In some embodiments, apparatus 100 may be configured to utilize a feedback form machine learning model. A feedback form machine learning model may be trained with training data correlating procedural performance feedback data to feedback forms. Training data may be received through user input, external computing devices, and/or previous iterations of processing. A feedback form machine learning model may be configured to input procedural performance feedback data and output feedback forms. Apparatus 100 may be configured to utilize a feedback form machine learning model to determine a form of feedback to display. Guidance may include procedural feedback such as, but not limited to, correct hand positions, correct chest compression form, and the like. In some embodiments, guidance may include audio and/or other feedback to convey procedural steps such as, but not limited to, chest compression rhythms. In some embodiments, guidance may include displaying verbal and/or textual information. For instance and without limitation, verbal and/or textual information may include a checklist, an order of procedural steps, and the like. Apparatus 100 may modify data displayed through display unit to provide an effective form of data communication, since other displays fail to use optical data, threshold comparisons, and the like to determine display content. Apparatus 100 may use a machine learning model and/or classification model to further improve content and/or data displayed through display unit. In some embodiments, apparatus 100 may utilize a fuzzy logic system to determine a form to display through display unit. In some embodiments, apparatus 100 may use a data structure and/or database to link guidance data output by machine-learning models to contents and/or form of display.

Still referring to FIG. 1, in some embodiments, apparatus 100 may generate a user profile as a function of procedural performance parameter 124. A "user profile" as used in this disclosure is a set of data pertaining to an individual. A user profile may include, but is not limited to, procedural performance parameter data, feedback data, and/or a rating of a user. A rating of a user may be determined by a scoring of procedural performance parameter 124. In some embodiments, a rating of a user may include a CPR certification rating. For instance and without limitation, a user profile may include data showing a user has completed all training necessary to become CPR certified. As another non-limiting example, a user profile may include a rating of a user showing the user is 80% ready for CPR certification.

Still referring to FIG. 1, in some embodiments, apparatus 100 may include an audio feedback unit. Audio feedback unit may be configured to communicate procedural training feedback to a user using sound. In some embodiments, an audio feedback unit may include a speaker. In some embodiments, an audio feedback unit may be a component of an AR device. In a non-limiting example, apparatus 100 may compare procedural performance parameter 124 to procedural performance threshold 128 and may provide audio feedback based on the comparison; in this example, if the comparison indicates that a user is performing well, then processor 104 may transmit data to audio feedback unit configuring audio feedback unit to output a sound saying, "good job." In another non-limiting example, if a comparison between procedural performance parameter 124 to procedural performance threshold 128 indicates that a user is performing chest compressions too rapidly in CPR training, then processor 104 may transmit data to audio feedback unit configuring audio feedback unit to output an audio message instructing the user to slow down, and/or may output regular beats at the correct chest compression pace.

Still referring to FIG. 1, in some embodiments, apparatus 100 may include a haptic feedback unit. Haptic feedback unit may be configured to communicate procedural training feedback to a user using touch. Haptic feedback may include, in non-limiting examples, application of a force, a vibration, and/or a motion to a user. A haptic feedback unit may include, in non-limiting examples, a component in an AR device, a component in a controller, a component in a mannequin, and the like. In a non-limiting example, if procedural performance parameter 124 indicates that a user is performing chest compressions in CPR too rapidly, then a mannequin including a haptic feedback unit may briefly vibrate at regular intervals at the correct chest compression pace. In another non-limiting example, if procedural performance parameter 124 indicates that a user immobilized a mannequin on a longboard in a way that does not secure a certain part of the mannequin, then that part of the mannequin may vibrate using a haptic feedback unit.

Still referring to FIG. 1, in some embodiments, AR device 136 may be used to communicate video or audio data to a user in order to introduce a procedure. In some embodiments, a user may select an instructional video from a GUI displayed using AR device 136, and AR device 136 may display the instructional video. In some embodiments, such an instructional video may include video and audio data. Such an instructional video may include, in non-limiting examples, a video of an instructor demonstrating proper form of a procedure such as CPR, and a video depicting how to use an application that performs a process described herein.

Still referring to FIG. 1, procedural training may include a user. An "user" as used in this disclosure is an individual. In some embodiments, user may include an individual looking to receive a medical certification such as a CPR certification or an EMT certification. In some embodiments, a user may wear AR device 136. In some embodiments, procedural training may include a user and a subject. As used herein, a subject is a human, other organism, or object that a procedure is performed on. In a non-limiting example, a subject may include a mannequin designed for CPR training. In another non-limiting example, a subject of a procedure for putting a subject's limb in a sling may include a healthy human. In some embodiments, a mannequin may include one or more sensors, such as, but not limited to, accelerometers, gyroscopes, inertia measurement units (IMU), and the like. In some embodiments, a mannequin may include a feedback unit such as a haptic feedback unit. In some embodiments, procedural training may include two or more mannequins. In some embodiments, procedural training may include a test device that is not a mannequin.

Still referring to FIG. 1, a user may perform a procedure, such as CPR, on a mannequin. Performing CPR may include, but is not limited to, checking an individual responsiveness, calling for help, positioning an individual on their back, positioning hands and/or fingers, giving chest compressions, and/or breathing into a mouth of an individual. Sensor may record images and/or videos of each step of performed CPR of user. In some embodiments, sensor may record an entire CPR procedure from start to finish. In other embodiments, sensor may record user in real time.

Still referring to FIG. 1, sensor may communicate optical data to application layer 204. Sensor may include, but is not limited to, an AR device camera, webcam, smartphone camera, laptop camera, and/or other camera. Application layer 204 may communicate optical data, procedural performance parameters, and the like to machine learning layer 208. Machine learning layer 208 may communicate procedural training feedback through AR device 136. Procedural training feedback may include procedural performance parameters and/or procedural performance thresholds. For instance and without limitation, procedural training feedback may include a procedural performance parameter showing a rate of 90 chest compressions a minute, and a procedural performance threshold of 100 chest compressions a minute. Procedural training feedback may include one or more corrective actions. A "corrective action" as used in this disclosure is a step that improves a procedure score. Corrective actions may include, but are not limited to, hand positioning, finger positioning, chest compression depth, chest compression frequency, chest compression pressure, and the like. Procedural training feedback may include historical data of procedural performance parameters. In some embodiments, procedural training feedback may include a ranked list of corrective actions. A ranked list may include two or more corrective actions in descending order of importance based on a procedure. For instance and without limitation, procedural training feedback may display a list of corrective actions including "increase chest compression depth", "increase chest compression frequency", and "correct hand positioning". Procedural training feedback may include a color coded system, such as without limitation, green representing "good", yellow representing "average", and/or red representing "bad."

Figure 2:
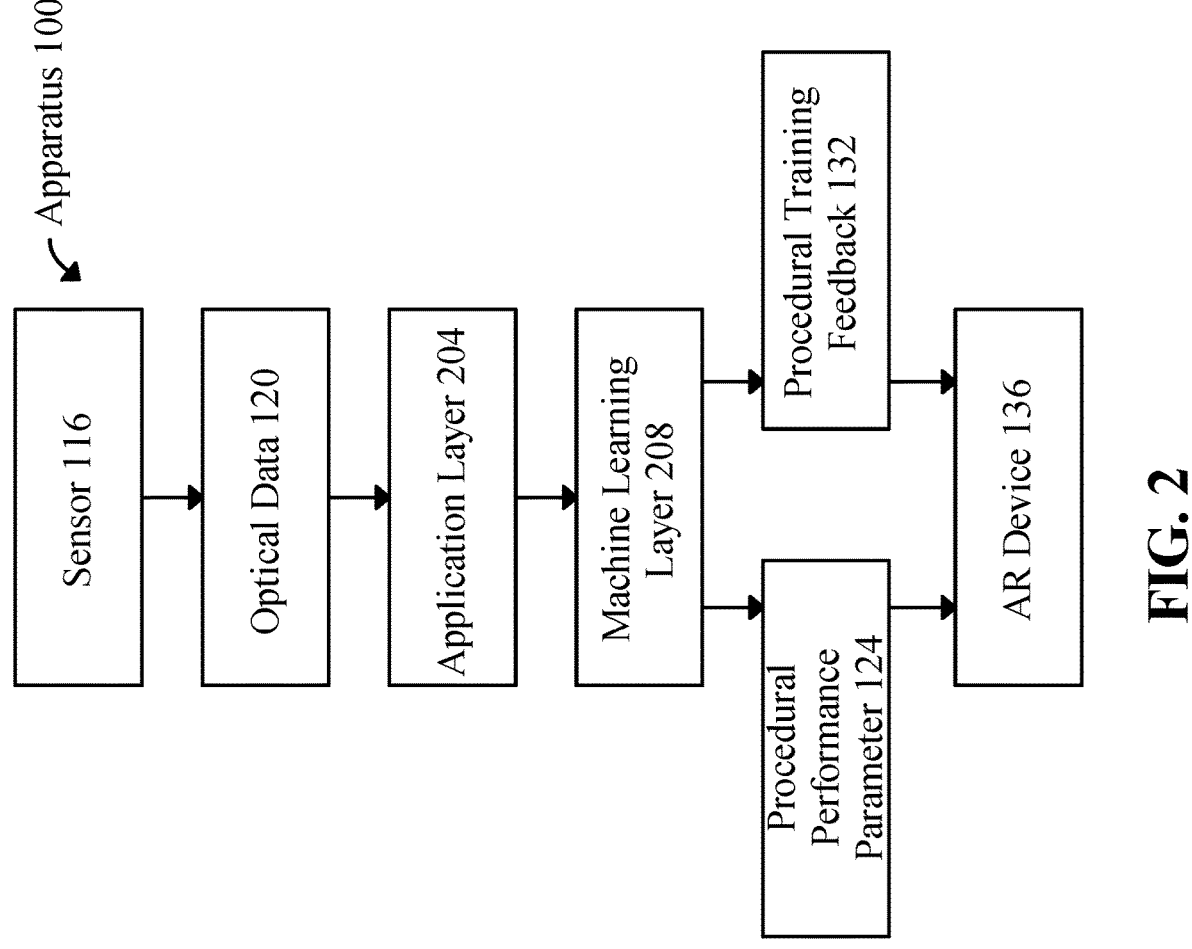
FIG. 2 is an exemplary embodiment of a block diagram of an apparatus for procedural training.

Referring now to FIG. 2, another embodiment of apparatus 100 is presented. Apparatus 100 may be as described above in FIG. 1. In some embodiments, apparatus 100 may be configured to communicate optical data 120 to application layer 204. An "application layer" as used in this disclosure is a computer program interface. Application layer 204 may include an application programming interface (API), web interface, mobile application, and the like. A web interface of application layer 204 may be configured to determine procedural performance parameter 124 as a function of optical data 120 and communicate procedural performance data 124 to apparatus 100 and/or AR device 136. In some embodiments, application layer 204 may run on a cloud-based network, such as a remote server and/or other computing device. Application layer 204 may determine procedural performance parameter 124 as a function of optical data 120. In some embodiments, application layer 204 may be configured to provide determinations of optical data 120, such as, but not limited to, initial classifications of optical data 120. Application layer 204 may be configured to provide apparatus 100 with procedural performance parameter 124, which may be displayed on AR device 136.

Still referring to FIG. 2, in some embodiments, application layer 204 may be configured to communicate with machine learning layer 208. A "machine learning layer" as used in this disclosure is a computing device configured to run a machine learning model. In some embodiments, machine learning layer 208 may run on a cloud-based network, such as but not limited to, a remote computing device, server, and the like. In some embodiments, machine learning layer 208 may input optical data 120 and output procedural performance parameter 124. As a non-limiting example, optical data 120 may include a live video of an individual performing CPR on a mannequin, which may be input into machine learning layer 208 through application layer 204. Machine learning layer 208 may determine procedural performance parameter 124 to include chest compressions, hand orientations, chest compression depth, and the like. Machine learning layer 208 may be configured to run a feedback machine learning model as described above in FIG. 1. Application layer 204 may communicate optical data 120 to machine learning layer 208. Machine learning layer 208 may input optical data 120 and output procedural training feedback 132. Machine learning layer 208 may output procedural training feedback 132 through AR device 136. Apparatus 100 may utilize application layer 204 and/or machine learning layer 208 to efficiently process optical data 120 and analyze procedural performance parameter 124 to determine procedural training feedback 132 by offloading intensive computational tasks to application layer 204 and/or machine learning layer 208. In some embodiments, machine learning layer 208 may train a machine learning model and communicate the machine learning model to apparatus 100. Apparatus 100 may receive a trained machine learning model from, but not limited to, machine learning layer 208, an external computing device, and/or user input. A machine learning model may include any machine learning model as described throughout this disclosure.

Figure 3:
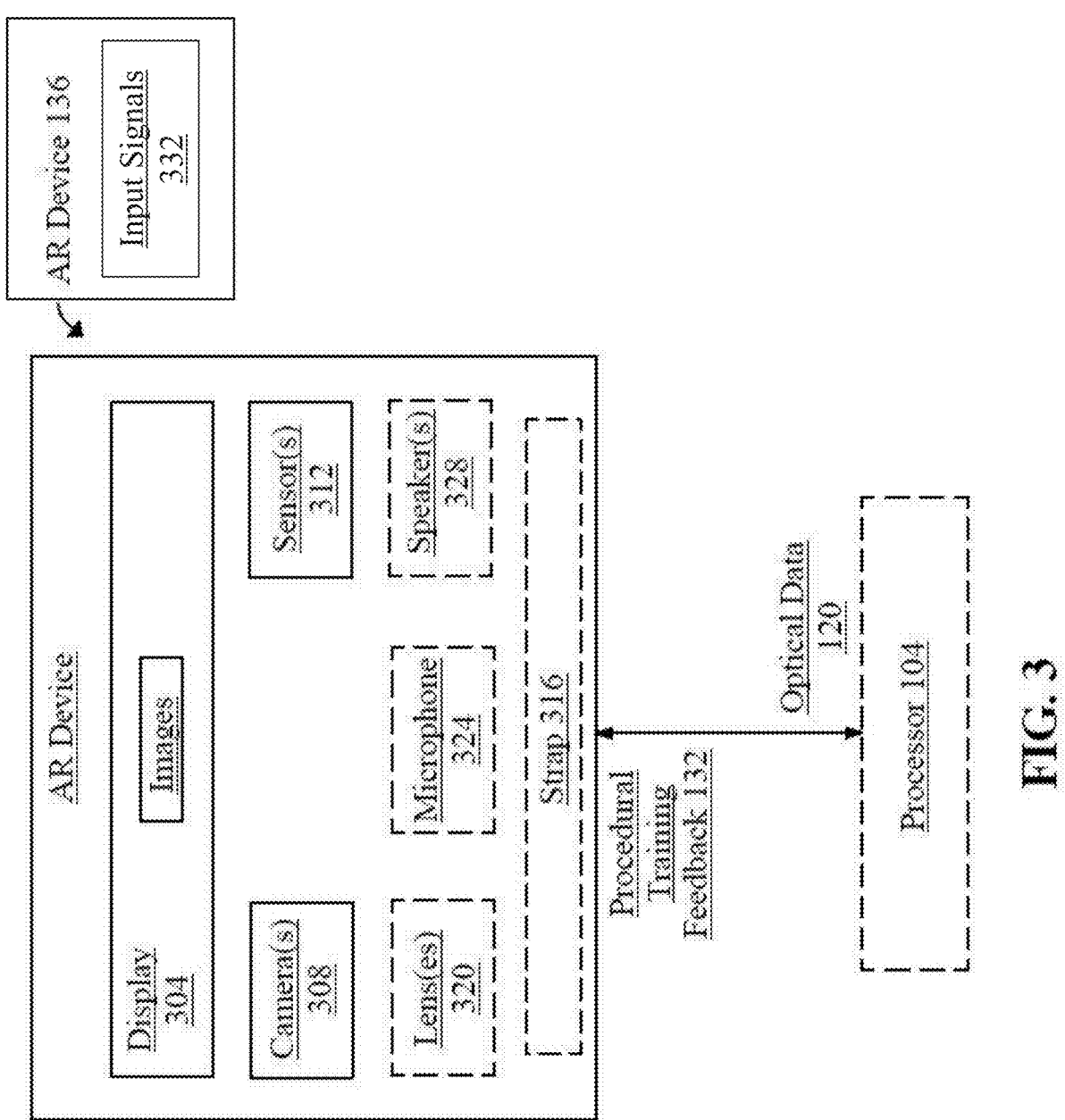
FIG. 3 is an exemplary embodiment of a block diagram of an AR device.

Referring now to FIG. 3, an exemplary embodiment of AR device 136 is illustrated. AR device 136 may include a display 304, at least a camera 308 and at least a sensor 312. Display 304 may be configured to exhibit visual images, such as visual procedural training feedback, to a user. AR device 136 may include a view window such that a user wearing AR device 136 may be able to observe the user's environment while viewing an image displayed by AR device 136. In some embodiments, AR device 136 may display images to a user by projecting them onto a section of a view window. In some embodiments, AR device 136 may display images to a user using a screen that does not fully obscure a user's view. At least a camera 308 may be configured to capture external visual images and provide the external visual images to display 304. At least a sensor 312 may include a motion tracking sensor. AR device 136 may be configured to communicatively connect with processor 104. In some embodiments, AR device 136 may include a head-worn or head-mounted device that covers a user's or wearer's eyes for an immersive experience (e.g., 3D or 2D).

Still referring to FIG. 3, display 304 of AR device 136 may be configured to exhibit visual images, such as visual procedural training feedback, to a user. These visual images may include purely simulated images, partially simulated images and/or real-life images. In a non-limiting example, these images may include a rendering of a virtual character correctly performing CPR. Images may be presented in 3D or 2D format. Suitable optics and the like may be included in, incorporated with or used in conjunction with AR device 136 to facilitate viewing and displaying of the images. An image may include a digital image and may be a binary presentation of visual information. An image may also be referred to as a picture that has been created or copied and stored in electronic form.

Still referring to FIG. 3, display 304 may be, as non-limiting examples, an OLED display, an LCD display, a retinal projection display, and the like. Display 304 may include an electronic device configured to visually display images and/or associated data. Display 304 may be in the form of a screen which may provide a digital image, or the like. Such a screen may be a combination of two monitors, for example, one for each eye, wherein the monitors do not fully obstruct a user's view. Display 304 may have a variety of resolutions. In a non-limiting example, display 304 may include a 1080p display. In another non-limiting example, display 304 may include a 1440p display. In yet another non-limiting example, display 304 may include a 4000p display. Higher resolutions may also be desirable in order to minimize or eliminate any pixelation effect. For example, resolutions of up to 8000 and beyond, per eye, may be desirable in order to limit the pixelation effect that a user sees when looking at the display.

Still referring to FIG. 3, at least a camera 308 of AR device 136 may be configured to capture external visual images and provide the external visual images to, for example, processor 104, application layer 204, or display 304. Camera 308 may offer an immersive viewing experience by capturing a 360-degree view of photos and videos. By using camera 308, the visual imagery may move up, down, left, right or in any direction as function of a user's moving head. A plurality of cameras 308 may be provided, as needed or desired. For example, a left camera and a right camera may be utilized which may provide separate images to each user eye. In some cases, camera(s) 308 may efficaciously also serve as a sensor (e.g. motion sensor) or the like, as needed or desired. In some embodiments, AR device 136 may be further configured to superimpose visual images generated via simulations only with the external visual images as captured by camera(s) 308 and display or exhibit them to user on display 304. As used in this disclosure, an "external visual image" is an image of a real-life environment. This external image may be around user, but also may be in proximity to user or remote from user.

Still referring to FIG. 3, AR device 136 may include a camera 308. Camera 308 may be an electronic device or equipment device for capturing a photographic image or recording a video, using film or digital memory. Camera 308 may be a device for capturing and/or recording visual images in the form of photographs, film, or video signals. Camera 308 may include one or more lenses, filters and/or other optical pieces. Camera(s) 308 may include a 360 degree camera configured to capture the entire environment around a user, as needed or desired. Multiple cameras and/or lenses may be used for such a 360-degree environment capture. Suitable software may be used in conjunction with multiple cameras 308 to "stitch" together images from different cameras to create a seamless single image, as needed or desired. In an embodiment, at least a camera 308 may include two cameras. Camera 308 may be communicatively connected to processor 104.

Still referring to FIG. 3, at least a sensor 312 of AR device 136 may include a motion tracking sensor. Motion tracking sensor may include, without limitation, a gyroscope, accelerometer, magnetometer or the like, among others. Sensor 312 may include a head motion tracking sensor configured to track head movement of the user. Sensor 312 may include an eye motion tracking sensor configured to track eye movement of user. Sensor 312 may be communicatively connected to processor 104 for transmitting signals thereto. Input signals 332 from VR device 136 to processor 104 may include a signal detected by motion tracking sensor.

Still referring to FIG. 3, AR device 136 is further configured to receive input signals 332 associated with user and transmit input signals 332 to processor 104. These input signals may be indicative of, for example, user motion, and may be used by processor 104 to provide suitable image data to AR device 136 for display on display 304 of AR device 136. Input signals 332 may be provided directly or indirectly by multimode AR device 136. Input signals 332 may be based on voice commands and/or gestures. Input signals 332 may be based on a user's manipulation of a joystick, a button, a handle, a lever, and the like.

Still referring to FIG. 3, AR device 136 may be further configured to receive procedural training feedback from processor 104. Procedural training feedback may include a plurality of images which are displayed on display 304 of AR device 136 for viewing by user. In response to an input from a user and/or instructor, image data, such as a video of an instructor performing a procedure, may be provided to AR device 136 and other physical componentry, if present. Besides visual images, procedural training feedback may also provide other sensory feeds such as audio, tactile and motion simulations, as described above.

Still referring to FIG. 3, AR device 136 may further include a strap 316 configured to secure AR device 136 to a head of user. AR device 136 may be designed for ease of fit and be made from a suitable material (e.g. a light carbon material) with a dial mechanism that users can control to fit their heads. Strap 316 may be adjustable to provide a proper fit for users of different sizes. AR device 136 may further include at least a lens 320 configured to enhance image viewing for a user. AR device 136 may further include at least a microphone 324 configured for user to provide voice commands. AR device 136 may further include at least a speaker 328 configured to provide audio to user. AR device 136 may further include a controller (such as a processor or computing device) to communicate with various components of headset and/or with processor 104, and the like, among others. As used in this disclosure, a "strap" is a component for temporarily binding or clamping objects together. As used in this disclosure, a "lens" is a clear or semi-opaque substance for permitting transmission of light rays therethrough. As used in this disclosure, a "microphone" is a device or transducer that converts sound into an electrical signal. As used in this disclosure, a "speaker" is a device or transducer that converts electromagnetic waves into sound waves.

Still referring to FIG. 3, in some embodiments, augmented reality device 104 may include a motion sensor. A motion sensor may include, without limitation, a microelectromechanical system (MEMS) sensor. A motion sensor may include, without limitation, an inertial measurement unit (IMU). A motion sensor may include one or more accelerometers; one or more accelerometers may include a plurality of accelerometers, such as three or more accelerometers positioned to span three dimensions of possible acceleration, so that any direction and magnitude of acceleration in three dimensions may be detected and measured in three dimensions. A motion sensor may include one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. A motion sensor may include, without limitation magnetic sensors such as Hall effect sensors, compasses such as solid-state compasses, or the like.

Figures 4, 5:
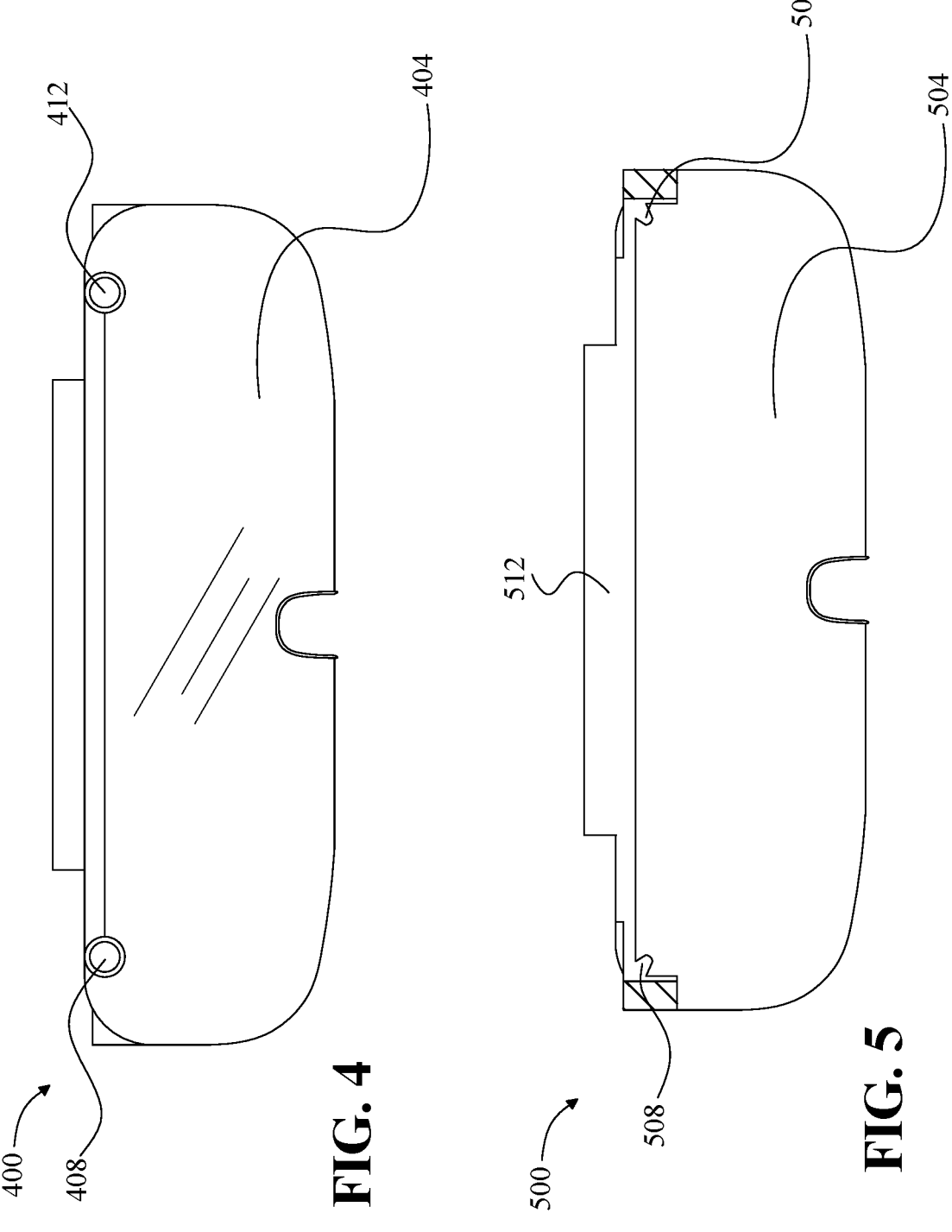
FIG. 4 is a schematic diagram of an embodiment of an augmented reality device.
FIG. 5 is a schematic diagram of an embodiment of an augmented reality device.

Referring now to FIG. 4, an exemplary embodiment of a front view 400 of an augmented reality device is depicted. As a non-limiting example, AR device 136 may take a form of a pair of goggles or eyewear, and/or may be incorporated in a headset or the like. Augmented reality device may include a lens 404, through which a user may view a field of vision; in some embodiments, lens 404 may function as a view window. AR device 136 may include a right camera 408 and/or a left camera 412, which may capture stereoscopic images and video.

Referring now to FIG. 5, an exemplary embodiment of a rear view 500 of an augmented reality device is illustrated.

AR device 136 may include a display 504, which may function as a view window and/or a projection device. Alternatively, or additionally, one or more projectors 508 may project images on display. A component housing 512 may include circuitry, a power source such as a battery and/or a port for an external power source connection, processor 104, and the like.

Figure 6:
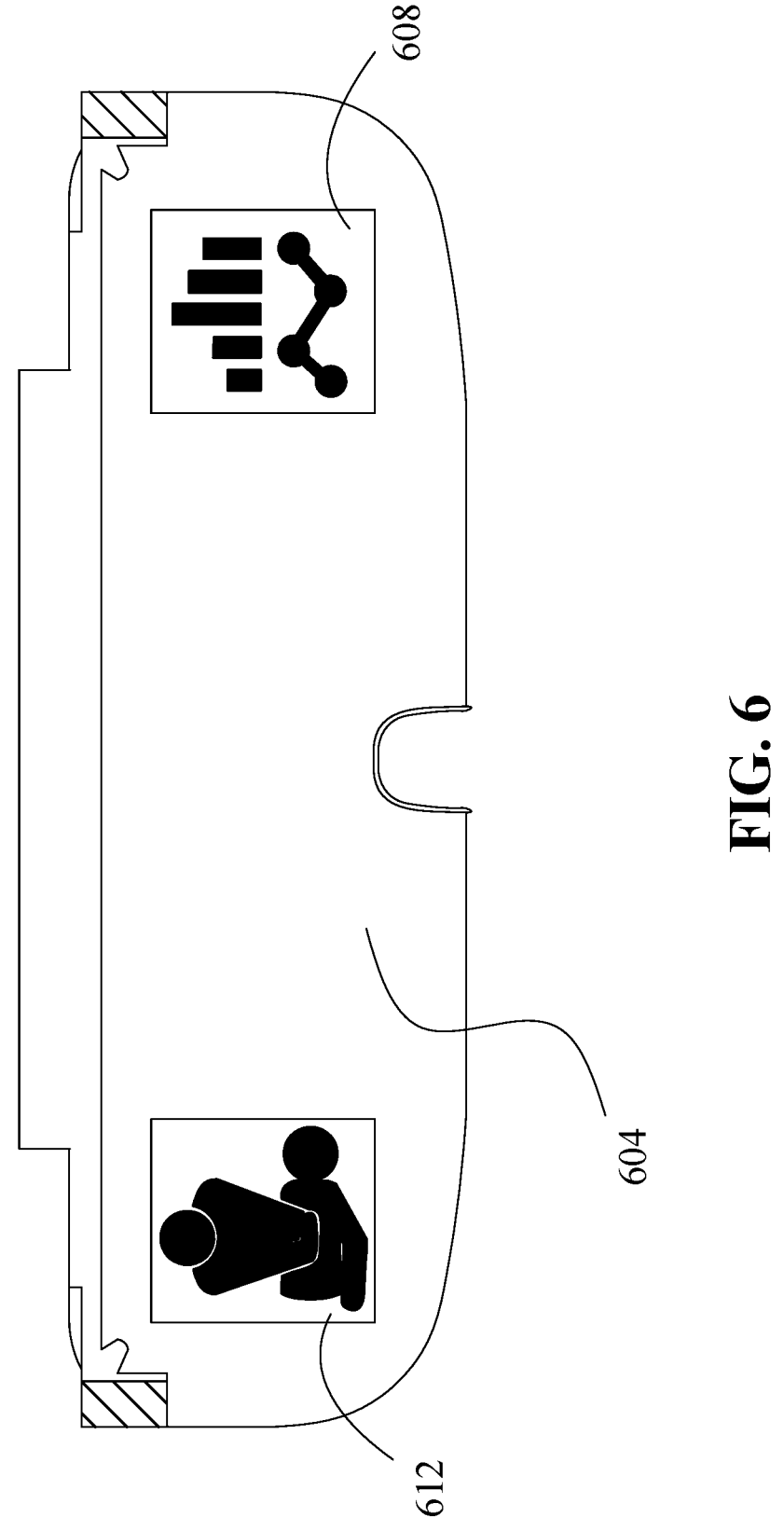
FIG. 6 is a diagram of an embodiment of an augmented reality device, including exemplary data being displayed.

Now referring to FIG. 6, an exemplary embodiment of AR device 136 is disclosed. In some embodiments, AR device 136 may include a view window 604 through which a user may be able to view their environment. In some embodiments, AR device 136 may display a procedural performance parameter to a user, as in element 608. In a non-limiting example, AR device 136 may display the frequency with which a user is performing chest compressions in CPR training, and a recommended chest compression rate. In some embodiments, AR device 136 may display data from an instructor device to a user, as in element 612. In a non-limiting example, data from an instructor device may include a video demonstration of how to correctly perform a procedure such as CPR.

Figure 7:
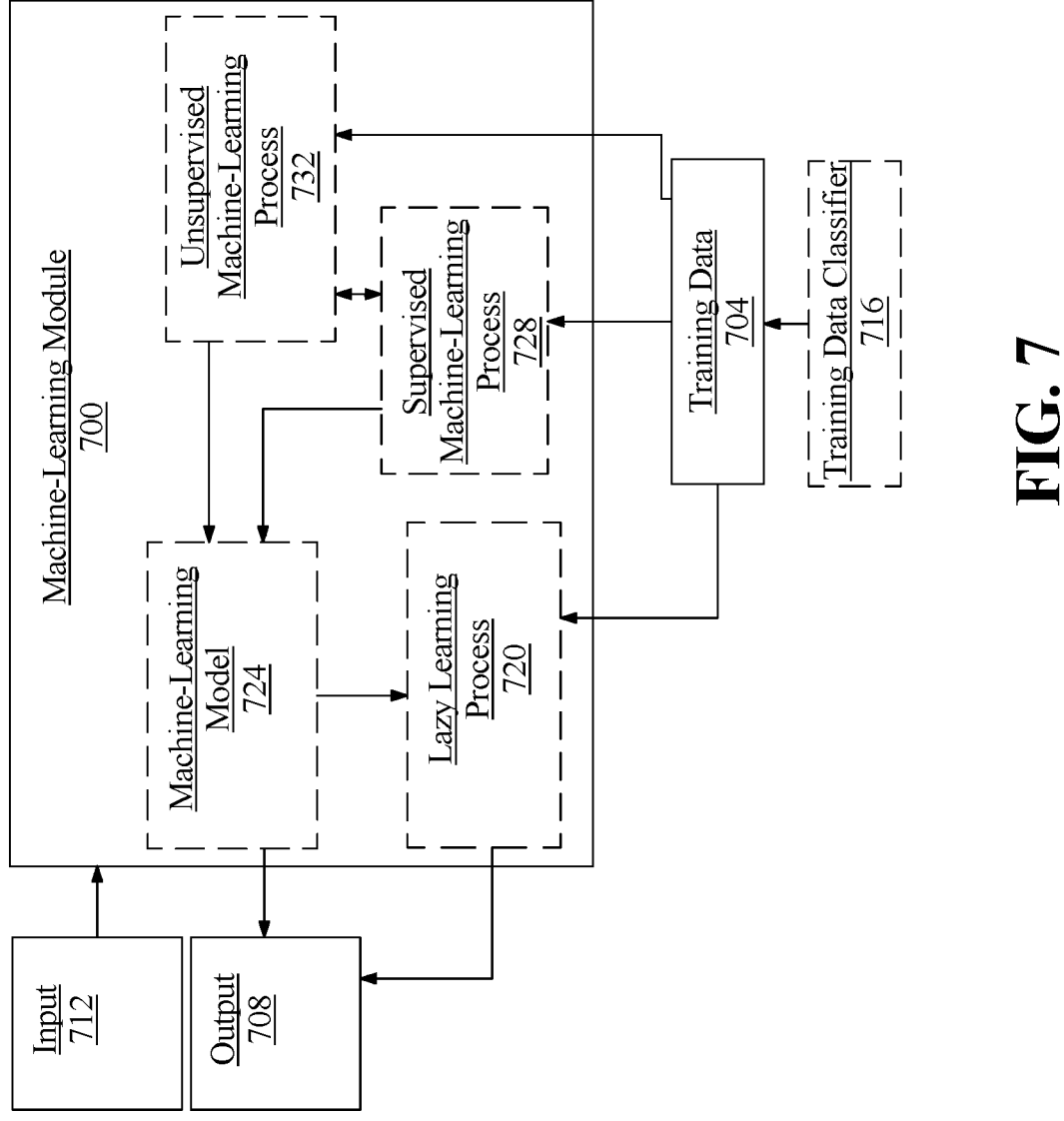
FIG. 7 is a block diagram of an exemplary embodiment of a machine learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example inputs may include procedural performance parameters and outputs may include procedural training feedback.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to pressure, depth, compression frequency, hand positioning, and the like.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include procedural performance parameters as described above as inputs, procedural training feedback as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
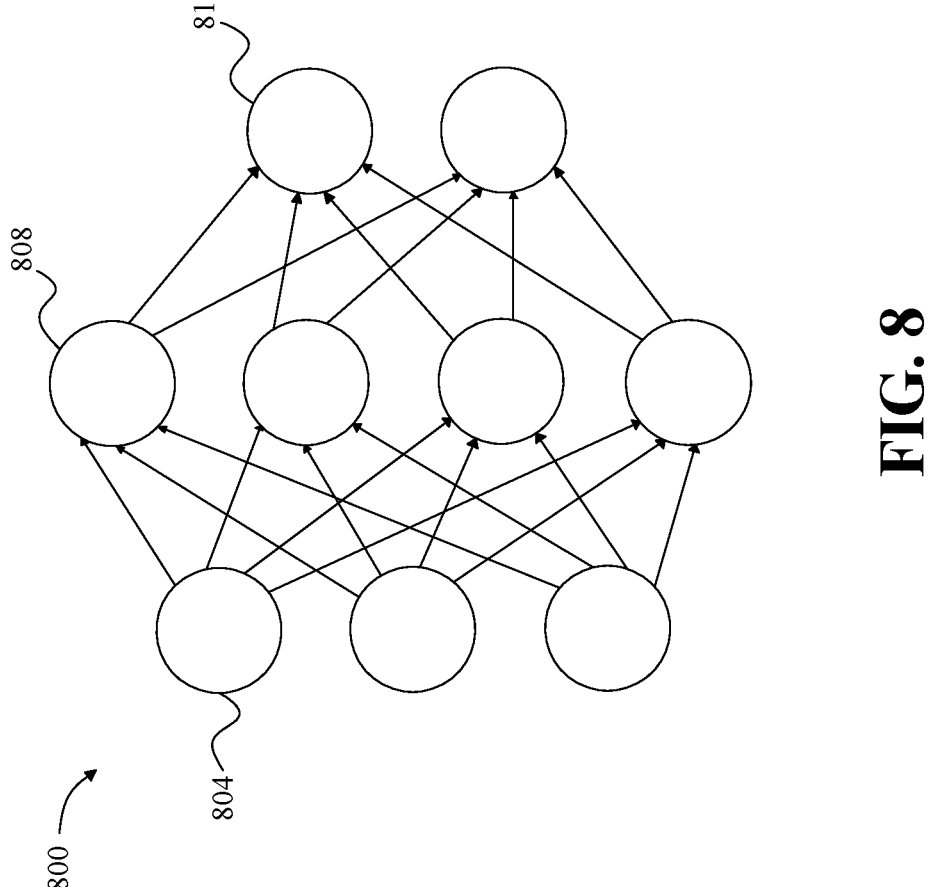
FIG. 8 is an exemplary embodiment of a neural network.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 9:
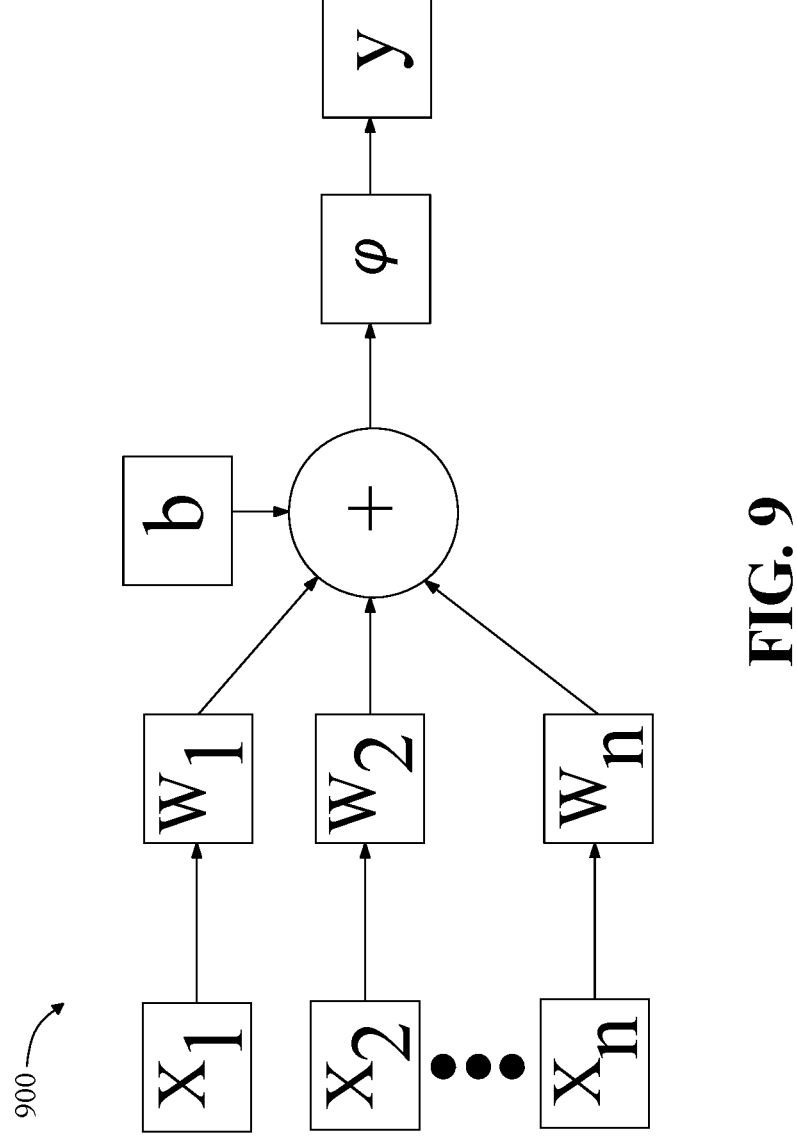
FIG. 9 is an exemplary embodiment of a node of a neural network.

Referring now to FIG. 9, an exemplary embodiment of a node 900 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x*\text{sigmoid}(x)$, a Gaussian error linear unit function such as $f(x) = \alpha(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 10:
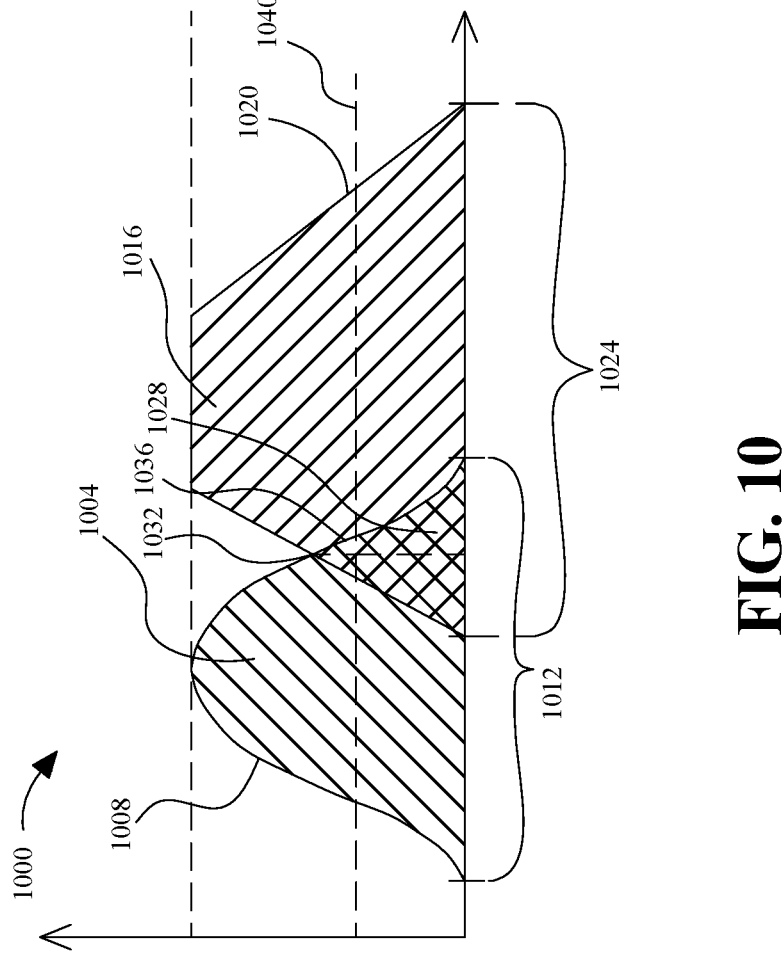
FIG. 10 is an exemplary embodiment of a fuzzy set comparison.

Referring to FIG. 10, an exemplary embodiment of fuzzy set comparison 1000 is illustrated. A first fuzzy set 1004 may be represented, without limitation, according to a first membership function 1008 representing a probability that an input falling on a first range of values 1012 is a member of the first fuzzy set 1004, where the first membership function 1008 has values on a range of probabilities such as without limitation the interval [0,1], and an area beneath the first membership function 1008 may represent a set of values within first fuzzy set 1004. Although first range of values 1012 is illustrated for clarity in this exemplary depiction as a range on a single number line or axis, first range of values 1012 may be defined on two or more dimensions, representing, for instance, a Cartesian product between a plurality of ranges, curves, axes, spaces, dimensions, or the like. First membership function 1008 may include any suitable function mapping first range 1012 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \dfrac{x - a}{b - a}, \text{ for } a \leq x < b \\ \dfrac{c - x}{c - b}, \text{ if } b < x \leq c \end{cases}$$

a trapezoidal membership function may be defined as:

$$y(x, a, b, c, d) = \max\left(\min\left(\frac{x - a}{b - a}, 1, \frac{d - x}{d - c}\right), 0\right)$$

a sigmoidal function may be defined as:

$$y(x, a, c) = \frac{1}{1 - e^{-a(x - c)}}$$

a Gaussian membership function may be defined as:

$$y(x, c, \sigma) = e^{-\frac{1}{2}\left(\frac{x - c}{\sigma}\right)^2}$$

and a bell membership function may be defined as:

$$y(x, a, b, c,) = \left[1 + \left|\frac{x - c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 10, first fuzzy set 1004 may represent any value or combination of values as described above, including output from one or more machine-learning models and a procedural performance, parameter a predetermined class, such as without limitation competency. A second fuzzy set 1016, which may represent any value which may be represented by first fuzzy set 1004, may be defined by a second membership function 1020 on a second range 1024; second range 1024 may be identical and/or overlap with first range 1012 and/or may be combined with first range via Cartesian product or the like to generate a mapping permitting evaluation overlap of first fuzzy set 1004 and second fuzzy set 1016. Where first fuzzy set 1004 and second fuzzy set 1016 have a region 1028 that overlaps, first membership function 1008 and second membership function 1020 may intersect at a point 1032 representing a probability, as defined on probability interval, of a match between first fuzzy set 1004 and second fuzzy set 1016. Alternatively or additionally, a single value of first and/or second fuzzy set may be located at a locus 1036 on first range 1012 and/or second range 1024, where a probability of membership may be taken by evaluation of first membership function 1008 and/or second membership function 1020 at that range point. A probability at 1028 and/or 1032 may be compared to a threshold 1040 to determine whether a positive match is indicated. Threshold 1040 may, in a non-limiting example, represent a degree of match between first fuzzy set 1004 and second fuzzy set 1016, and/or single values therein with each other or with either set, which is sufficient for purposes of the matching process; for instance, threshold may indicate a sufficient degree of overlap between an output from one or more machine-learning models and/or a procedural performance parameter and a predetermined class, such as without limitation competency for combination to occur as described above. Alternatively or additionally, each threshold may be tuned by a machine-learning and/or statistical process, for instance and without limitation as described in further detail below.

Further referring to FIG. 10, in an embodiment, a degree of match between fuzzy sets may be used to classify a procedural performance parameter with competency. For instance, if a procedural performance parameter has a fuzzy set matching a competency fuzzy set by having a degree of overlap exceeding a threshold, apparatus 100 may classify the procedural performance parameter as belonging to the competency fuzzy set. Where multiple fuzzy matches are performed, degrees of match for each respective fuzzy set may be computed and aggregated through, for instance, addition, averaging, or the like, to determine an overall degree of match.

Still referring to FIG. 10, in an embodiment, a procedural performance parameter may be compared to multiple competency fuzzy sets. For instance, a procedural performance parameter may be represented by a fuzzy set that is compared to each of the multiple competency fuzzy sets; and a degree of overlap exceeding a threshold between the procedural performance parameter fuzzy set and any of the multiple competency fuzzy sets may cause apparatus 100 to classify the procedural performance parameter as belonging to competency fuzzy set. For instance, in one embodiment there may be two competency fuzzy sets, representing respectively perfect competency and amateur competency. First competency fuzzy set may have a first fuzzy set; Second competency fuzzy set may have a second fuzzy set; and a procedural performance parameter may have a procedural performance parameter fuzzy set. Apparatus 100, for example, may compare a procedural performance parameter fuzzy set with each of perfect competency fuzzy set and amateur competency fuzzy set, as described above, and classify a procedural performance parameter to either, both, or neither of perfect competency fuzzy set or amateur competency fuzzy set. Machine-learning methods as described throughout may, in a non-limiting example, generate coefficients used in fuzzy set equations as described above, such as without limitation x, c, and σ of a Gaussian set as described above, as outputs of machine-learning methods. Likewise, a procedural performance parameter fuzzy set may be used indirectly to determine a fuzzy set, as a procedural performance parameter fuzzy set may be derived from outputs of one or more machine-learning models that take the procedural performance fuzzy set directly or indirectly as inputs.

Still referring to FIG. 10, a computing device may use a logic comparison program, such as, but not limited to, a fuzzy logic model to determine a performance score. A performance score may include, but is not limited to, amateur, average, competent, perfect, and the like; each such performance score may be represented as a value for a linguistic variable representing a performance score or in other words a fuzzy set as described above that corresponds to a degree of competency as calculated using any statistical, machine-learning, or other method that may occur to a person skilled in the art upon reviewing the entirety of this disclosure. In other words, a given element of a procedural performance parameter may have a first non-zero value for membership in a first linguistic variable value such as "1" and a second non-zero value for membership in a second linguistic variable value such as "2". In some embodiments, determining a performance score may include using a linear regression model. A linear regression model may include a machine learning model. A linear regression model may be configured to map data of procedural performance parameter such as chest compression data to one or more performance scores. A linear regression model may be trained using training data correlating procedural performance parameters to performance scores. A linear regression model may map statistics such as, but not limited to, highest performances, lowest performances, average performances, and the like. In some embodiments, determining a performance score of a procedural performance parameter may include using a performance score classification model. A performance score classification model may be configured to input collected data and cluster data to a centroid based on, but not limited to, frequency of appearance, linguistic indicators of performance, and the like. Centroids may include scores assigned to them such that elements of a procedural performance parameter may each be assigned a score. In some embodiments, a performance score classification model may include a K-means clustering model. In some embodiments, a performance score classification model may include a particle swarm optimization model. In some embodiments, determining a performance score of a procedural performance parameter may include using a fuzzy inference engine. A fuzzy inference engine may be configured to map one or more procedural performance parameter data elements using fuzzy logic. In some embodiments, a plurality of entity assessment devices may be arranged by a logic comparison program into performance score arrangements. A performance score arrangement" as used in this disclosure is any grouping of objects and/or data based on competency level and/or output score. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given competency level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 10, an inference engine may be implemented according to input and/or output membership functions and/or linguistic variables. For instance, a first linguistic variable may represent a first measurable value pertaining to a procedural performance parameter, such as a degree of chest compression depth while a second membership function may indicate a degree of chest compression pressure of a subject thereof, or another measurable value pertaining to a procedural performance parameter Continuing the example, an output linguistic variable may represent, without limitation, a score value. An inference engine may combine rules, such as: "if the chest compression depth is "high" and the chest compression frequency is "high", the performance score is "great"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 10, a procedural performance parameter to be used may be selected by user selection, and/or by selection of a distribution of output scores, such as 30% amateur, 40% moderate average, and 30% perfect or the like. Each score may be selected using an additional function such as a degree of competency as described above.

Now referring to FIG. 11, an exemplary method 1100 of augmented reality training is illustrated. In some embodiments, method 1100 may include using a sensor, capturing optical data 1105. In some embodiments, the sensor includes a camera incorporated in the AR device.

In some embodiments, method 1100 may include using a sensor, transmitting optical data to the at least a processor 1110.

In some embodiments, method 1100 may include using at least a processor, receiving optical data from the sensor, wherein the sensor is in electronic communication with the at least a processor 1115.

In some embodiments, method 1100 may include using at least a processor, determining, as a function of the optical data, a procedural performance parameter 1120. In some embodiments, determining, as a function of the optical data, a procedural performance parameter includes assessing performance of a medical procedure. In some embodiments, determining the procedural performance parameter includes: using at least a processor, receiving training data correlating optical data to procedural performance parameters; using at least a processor, training a procedural performance machine learning model with the training data, wherein the procedural performance machine learning model is configured to input optical data and output procedural performance parameters; and using at least a processor, determining, as a function of the procedural performance machine learning model and the optical data, the procedural performance parameter.

In some embodiments, method 1100 may include using at least a processor, determining visual procedural training feedback as a function of the procedural performance parameter and a procedural performance function 1125. In some embodiments, the visual procedural training feedback includes image data including instructional material.

In some embodiments, method 1100 may include, using at least a processor and a display unit, displaying the visual procedural training feedback to a user 1130. In some embodiments, the display unit further includes an AR device.

In some embodiments, method 1100 may further include using at least a processor, determining audio procedural training feedback as a function of the procedural performance parameter and the procedural performance function; and using at least a processor, communicating the audio procedural training feedback to the user. Audio procedural training feedback may include audio procedural training feedback as described with reference to FIG. 1. As a non-limiting example, audio procedural training feedback may include audio instruction of how to properly perform CPR. As another non-limiting example, audio procedural training feedback may include regular beats at the appropriate rate for CPR chest compressions. Audio procedural training feedback may be selected as a function of procedural performance parameter and procedural performance threshold. In a non-limiting example, procedural performance parameters may be compared to procedural performance thresholds multiple times such that a system may detect, for example, whether chest compressions are being performed too rapidly, too slowly, too deeply, or too shallowly; in this example, if chest compressions are being performed too shallowly, then audio procedural training feedback including instruction on the appropriate chest compression depth may be selected. In some embodiments, audio procedural training feedback may be output by an audio feedback unit, such as a speaker.

In some embodiments, method 1100 may further include using at least a processor, determining haptic procedural training feedback as a function of the procedural performance parameter and the procedural performance function; and using at least a processor, communicating the haptic procedural training feedback to the user. Haptic procedural training feedback may include haptic procedural training feedback as described with reference to FIG. 1. As a non-limiting example, haptic procedural training feedback may include haptic feedback output by a haptic feedback unit within a mannequin, where the haptic feedback is output at regular intervals at the appropriate rate for CPR chest compressions. Haptic procedural training feedback may be selected as a function of procedural performance parameter and procedural performance threshold. In a non-limiting example, procedural performance parameters may be compared to procedural performance thresholds multiple times such that a system may detect, for example, whether chest compressions are being performed too rapidly or too slowly; in this example, if chest compressions are being performed too slowly, then haptic procedural training feedback including regular haptic feedback at the appropriate rate for CPR chest compressions may be selected.

In some embodiments, method 1100 may further include using at least a processor, transmitting the optical data to an instructor device; using at least a processor, receiving instructional data from the instructor device; and using at least a processor, communicating the instructional data to the user. In some embodiments, the instructional data includes video data of an instructor performing a process; and communicating the instructional data to the user includes, using the AR device, displaying the instructional data to the user. In some embodiments, the instructional data includes audio data of an instructor describing a process.

In some embodiments, method 1100 may further include using at least a processor, communicating the optical data to a web interface; using the web interface, determining a procedural performance parameter as a function of the optical data; and using the web interface, communicating the procedural performance parameter to the at least a processor. In some embodiments, one or more steps of method 1100 may be done as described with respect to FIGS. 1-10.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
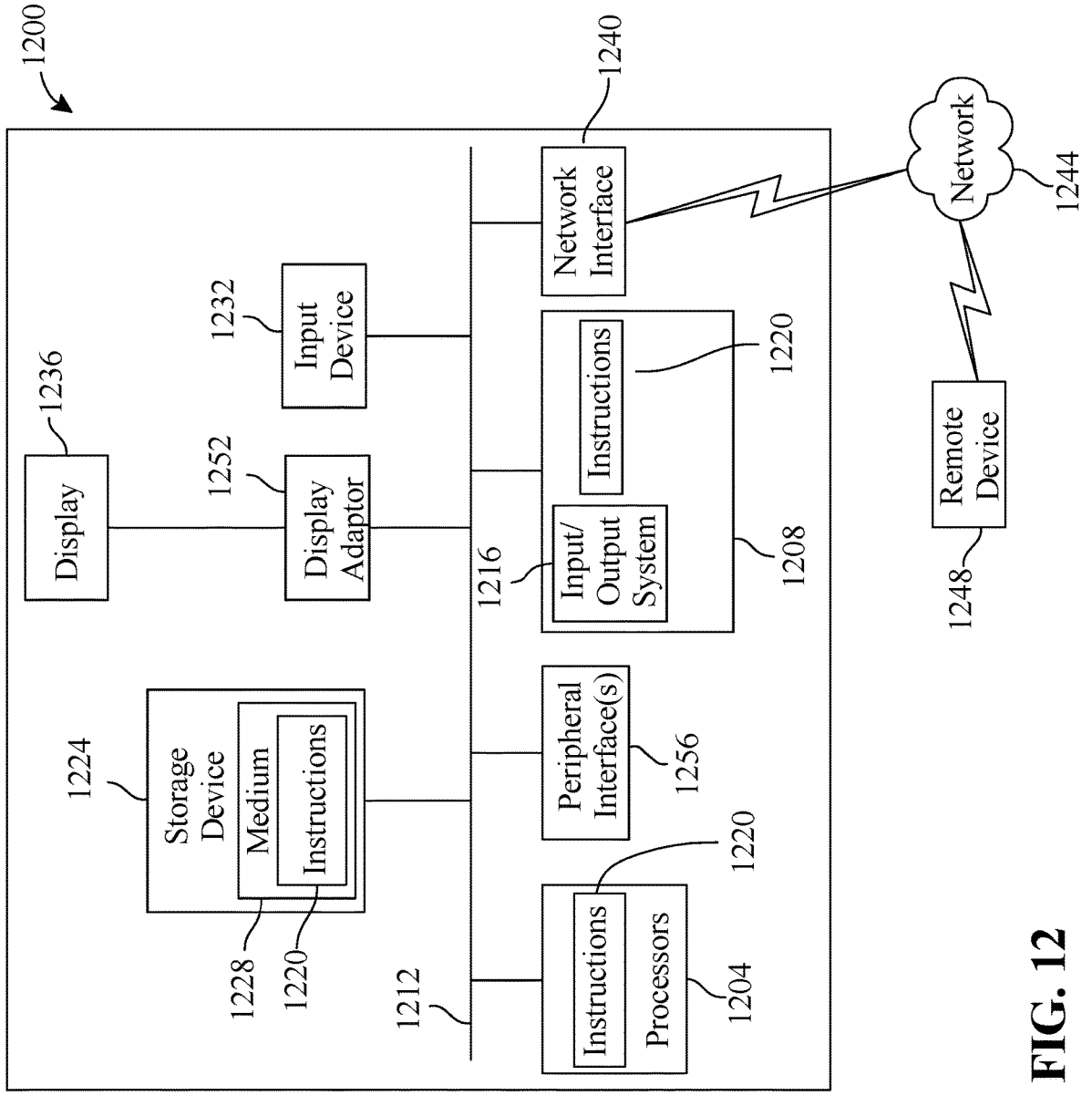
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIRE-WIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for augmented reality training, comprising:
at least a processor;
a sensor configured to:
capture optical data; and
transmit optical data to the at least a processor; and
a memory communicatively connected to the at least a processor, the memory containing instructions configuring the at least a processor to:
receive optical data from the sensor, wherein the sensor is in electronic communication with the at least a processor;
determine, as a function of the optical data, a procedural performance parameter;
determine visual procedural training feedback as a function of the procedural performance parameter and a procedural performance function; and
display, using a display unit, the visual procedural training feedback to a user; and
wherein the visual procedural training feedback comprises image data comprising instructional material.

2. The apparatus of claim 1, wherein:
the display unit further comprises an augmented reality device; and
the sensor includes a camera incorporated in the augmented reality device.

3. The apparatus of claim 1, wherein determining, as a function of the optical data, a procedural performance parameter comprises assessing performance of a medical procedure.

4. The apparatus of claim 1, wherein the memory further contains instructions configuring the at least a processor to:
determine audio procedural training feedback as a function of the procedural performance parameter and the procedural performance function; and
communicate the audio procedural training feedback to the user.

5. The apparatus of claim 1, wherein the memory further contains instructions configuring the at least a processor to:
determine haptic procedural training feedback as a function of the procedural performance parameter and the procedural performance function; and
communicate the haptic procedural training feedback to the user.

6. The apparatus of claim 1, wherein the memory further contains instructions configuring the at least a processor to:
transmit the optical data to an instructor device;
receive instructional data from the instructor device; and
communicate the instructional data to the user.

7. The apparatus of claim 6, wherein:
the instructional data comprises video data of an instructor performing a process; and
communicating the instructional data to the user comprises, using the augmented reality device, displaying the instructional data to the user.

8. The apparatus of claim 6, wherein the instructional data comprises audio data of an instructor describing a process.

9. The apparatus of claim 1, wherein the at least a processor is further configured to determine the procedural performance parameter by:
receiving training data correlating optical data to procedural performance parameters;
training a procedural performance machine learning model with the training data, wherein the procedural performance machine learning model is configured to input optical data and output procedural performance parameters; and
determining, as a function of the procedural performance machine learning model and the optical data, the procedural performance parameter.

10. The apparatus of claim 1, wherein the memory further contains instructions configuring the at least a processor to:
communicate the optical data to a web interface, wherein the web interface is configured to:
determine a procedural performance parameter as a function of the optical data; and
communicate the procedural performance parameter to the at least a processor.

11. A method of augmented reality training, the method comprising:
using a sensor, capturing optical data;
using a sensor, transmitting optical data to the at least a processor;
using at least a processor, receiving optical data from the sensor, wherein the sensor is in electronic communication with the at least a processor;
using at least a processor, determining, as a function of the optical data, a procedural performance parameter;
using at least a processor, determining visual procedural training feedback as a function of the procedural performance parameter and a procedural performance function; and using at least a processor and a display unit, displaying the visual procedural training feedback to a user; and wherein the visual procedural training feedback comprises image data comprising instructional material.

12. The method of claim 11, wherein:

the display unit further comprises an augmented reality device; and the sensor includes a camera incorporated in the augmented reality device.

13. The method of claim 11, wherein determining, as a function of the optical data, a procedural performance parameter comprises assessing performance of a medical procedure.

14. The method of claim 11, further comprising:

using at least a processor, determining audio procedural training feedback as a function of the procedural performance parameter and the procedural performance function; and using at least a processor, communicating the audio procedural training feedback to the user.

15. The method of claim 11, further comprising:

using at least a processor, determining haptic procedural training feedback as a function of the procedural performance parameter and the procedural performance function; and using at least a processor, communicating the haptic procedural training feedback to the user.

16. The method of claim 11, further comprising:

using at least a processor, transmitting the optical data to an instructor device;

using at least a processor, receiving instructional data from the instructor device; and using at least a processor, communicating the instructional data to the user.

17. The method of claim 16, wherein:

the instructional data comprises video data of an instructor performing a process; and communicating the instructional data to the user comprises, using the augmented reality device, displaying the instructional data to the user.

18. The method of claim 16, wherein the instructional data comprises audio data of an instructor describing a process.

19. The method of claim 11, wherein determining the procedural performance parameter comprises:

using at least a processor, receiving training data correlating optical data to procedural performance parameters;

using at least a processor, training a procedural performance machine learning model with the training data, wherein the procedural performance machine learning model is configured to input optical data and output procedural performance parameters; and using at least a processor, determining, as a function of the procedural performance machine learning model and the optical data, the procedural performance parameter.

20. The method of claim 11, further comprising:

using at least a processor, communicating the optical data to a web interface;

using the web interface, determining a procedural performance parameter as a function of the optical data; and using the web interface, communicating the procedural performance parameter to the at least a processor.

* * * * *